(12) United States Patent
Brunner et al.

(10) Patent No.: US 11,840,269 B2
(45) Date of Patent: Dec. 12, 2023

(54) HAND TRUCK

(71) Applicants:KETER PLASTIC LTD., Herzliya (IL); MILWAUKEE ELECTRIC TOOL CORPORATION, Brookfield, WI (US)

(72) Inventors: Yaron Brunner, Kibutz Gvat (IL); Izhar Shany, Kibutz Gvat (IL); Uri Parizer, Kibbutz Hukok (IL)

(73) Assignees: Keter Plastic Ltd., Herzliya (IL); Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 17/058,458

(22) PCT Filed: Jun. 20, 2019

(86) PCT No.: PCT/IL2019/050689
§ 371 (c)(1),
(2) Date: Nov. 24, 2020

(87) PCT Pub. No.: WO2020/003302
PCT Pub. Date: Jan. 2, 2020

(65) Prior Publication Data
US 2021/0300447 A1    Sep. 30, 2021

(30) Foreign Application Priority Data

Jun. 24, 2018   (IL) .......................................... 260225

(51) Int. Cl.
*B62B 1/12* (2006.01)
*B62B 1/00* (2006.01)
(Continued)

(52) U.S. Cl.
CPC ................ *B62B 1/12* (2013.01); *B62B 1/002* (2013.01); *B62B 1/14* (2013.01); *B62B 3/02* (2013.01); *B62B 3/04* (2013.01); *B62B 2202/12* (2013.01)

(58) Field of Classification Search
CPC .. B62B 1/12; B62B 1/002; B62B 1/14; B62B 3/02; B62B 3/04; B62B 2202/12
See application file for complete search history.

(56) References Cited

U.S. PATENT DOCUMENTS 495,537 A   4/1893   Westerman
509,839 A   11/1893  Bowley
(Continued)

FOREIGN PATENT DOCUMENTS

CA   2 562 993 A1   4/2007
CN   2608238 Y      3/2004
(Continued)

OTHER PUBLICATIONS

US 11,731,806 B2, 08/2023, Brunner et al. (withdrawn)
(Continued)

*Primary Examiner* — Bryan A Evans
(74) *Attorney, Agent, or Firm* — Vorys, Sater, Seymour and Pease LLP; Anthony P. Venturino; Maryellen Feehery Hank

(57) ABSTRACT

Provided is a hand truck comprising a frame having a first end, and a second end configured with a wheel set, and a ledge extending at said second end, wherein one or both of the frame and the ledge is configured with an articulation arrangement for detachably attaching thereto a utility unit, the articulation arrangement extending parallel to a plane of the respective frame or ledge.

25 Claims, 12 Drawing Sheets

(51) Int. Cl.
  *B62B 1/14*   (2006.01)
  *B62B 3/02*   (2006.01)
  *B62B 3/04*   (2006.01)

(56) References Cited

U.S. PATENT DOCUMENTS

| | | | |
|---|---|---|---|
| 1,081,378 A | 12/1913 | Freeman | |
| 1,084,360 A | 1/1914 | Rahm | |
| 1,112,943 A | 10/1914 | Stone | |
| 1,488,460 A | 3/1924 | Scheer | |
| 1,704,480 A | 3/1929 | Kicileski | |
| D85,986 S | 1/1932 | Myers | |
| 2,042,387 A | 5/1936 | High et al. | |
| 2,100,036 A | 11/1937 | Michal | |
| 2,103,106 A | 12/1937 | Yurkovitch | |
| 2,124,541 A | 7/1938 | Cassey | |
| 2,210,235 A | 8/1940 | Filbert | |
| 2,372,845 A | 4/1945 | Nelson | |
| 2,386,343 A | 10/1945 | Regenhardt | |
| 2,430,200 A | 11/1947 | Wilson | |
| 2,448,300 A * | 8/1948 | Eaddy | H01M 50/20 248/140 |
| 2,558,126 A | 6/1951 | Davenport | |
| 2,588,009 A | 3/1952 | Jones | |
| 2,733,076 A | 1/1956 | Burnett | |
| 2,814,402 A * | 11/1957 | Schaefer | B62B 1/14 206/322 |
| 2,939,613 A | 6/1960 | Herman et al. | |
| 2,970,358 A | 2/1961 | Elsner | |
| 3,005,282 A | 10/1961 | Christiansen | |
| 3,117,692 A | 1/1964 | Carpenter et al. | |
| 3,186,585 A | 6/1965 | Denny | |
| 3,201,035 A | 8/1965 | Martin et al. | |
| 3,225,865 A | 12/1965 | Downey | |
| 3,370,236 A | 2/1968 | Walker | |
| 3,423,786 A | 1/1969 | Arias, Jr. et al. | |
| 3,424,334 A | 1/1969 | Goltz | |
| 3,506,321 A | 4/1970 | Hampel | |
| 3,514,170 A | 5/1970 | Shewchuk | |
| 3,550,908 A | 12/1970 | Propst | |
| 3,552,817 A | 1/1971 | Marcolongo | |
| 3,567,298 A | 3/1971 | Ambaum et al. | |
| 3,685,866 A | 8/1972 | Patenaude | |
| 3,743,372 A | 7/1973 | Ruggerone | |
| D232,798 S | 9/1974 | Roche | |
| 3,835,623 A | 9/1974 | Kline | |
| 3,851,936 A | 12/1974 | Muller | |
| 3,935,613 A | 2/1976 | Kaneko | |
| 3,974,898 A | 8/1976 | Tullis et al. | |
| 3,999,818 A | 12/1976 | Schankler | |
| 4,043,566 A | 8/1977 | Johnson | |
| 4,122,925 A | 10/1978 | Schultheiss | |
| 4,168,076 A | 9/1979 | Johnson | |
| 4,243,279 A | 1/1981 | Ackeret | |
| 4,303,367 A | 12/1981 | Bott | |
| 4,363,496 A * | 12/1982 | Schreiner | B62B 3/10 280/47.35 |
| 4,491,231 A | 1/1985 | Heggeland et al. | |
| 4,524,985 A | 6/1985 | Drake | |
| 4,564,732 A | 1/1986 | Lancaster et al. | |
| 4,577,772 A | 3/1986 | Bigliardi | |
| D285,986 S | 10/1986 | Huang | |
| 4,639,005 A | 1/1987 | Birkley | |
| 4,643,494 A | 2/1987 | Marleau | |
| 4,660,725 A | 4/1987 | Fishman et al. | |
| 4,673,070 A | 6/1987 | Ambal | |
| 4,684,034 A | 8/1987 | Ono et al. | |
| 4,693,345 A | 9/1987 | Mittelmann | |
| 4,735,107 A | 4/1988 | Winkie | |
| 4,744,474 A * | 5/1988 | Tallving | A47F 5/135 211/133.1 |
| 4,790,549 A * | 12/1988 | Armand | B62B 3/02 211/186 |
| 4,805,859 A | 2/1989 | Hudson | |
| 4,817,237 A | 4/1989 | Murphy | |
| 4,929,973 A | 5/1990 | Nakatani | |
| 4,971,201 A | 11/1990 | Sathre | |
| 5,035,389 A | 7/1991 | Wang | |
| 5,035,445 A | 7/1991 | Poulin | |
| D319,016 S | 8/1991 | Kahl | |
| 5,098,235 A | 3/1992 | Svetlik | |
| D325,324 S | 4/1992 | Kahl | |
| 5,105,947 A | 4/1992 | Wise | |
| D326,815 S | 6/1992 | Meisner et al. | |
| 5,154,291 A | 10/1992 | Sur | |
| 5,240,264 A | 8/1993 | Williams | |
| D340,167 S | 10/1993 | Kahl | |
| 5,282,554 A | 2/1994 | Thomas | |
| 5,301,829 A | 4/1994 | Chrisco | |
| 5,325,966 A | 7/1994 | Chang | |
| 5,356,038 A | 10/1994 | Banks | |
| 5,356,105 A | 10/1994 | Andrews | |
| D352,208 S | 11/1994 | Brookshire | |
| 5,375,709 A | 12/1994 | Petro | |
| 5,429,235 A | 7/1995 | Chen | |
| 5,429,260 A | 7/1995 | Vollers | |
| 5,433,416 A | 7/1995 | Johnson | |
| D361,511 S | 8/1995 | Dickinson et al. | |
| 5,454,634 A | 10/1995 | Herbst et al. | |
| 5,538,213 A | 7/1996 | Brown | |
| 5,595,228 A | 1/1997 | Meisner et al. | |
| 5,608,603 A | 3/1997 | Su | |
| 5,622,296 A | 4/1997 | Pirhonen et al. | |
| 5,628,443 A | 5/1997 | Deutsch | |
| 5,653,366 A | 8/1997 | Liserre | |
| 5,664,292 A | 9/1997 | Chen | |
| D395,533 S | 6/1998 | Morison et al. | |
| 5,775,046 A | 7/1998 | Fanger et al. | |
| 5,797,617 A * | 8/1998 | Lin | B62B 1/125 280/37 |
| 5,850,996 A | 12/1998 | Liang | |
| 5,890,613 A | 4/1999 | Williams | |
| 5,906,381 A | 5/1999 | Hovatter | |
| 5,951,037 A * | 9/1999 | Hsieh | B62B 1/125 280/655 |
| 5,957,421 A | 9/1999 | Barbour | |
| D415,393 S | 10/1999 | Kei | |
| 5,988,473 A | 11/1999 | Hagan et al. | |
| D420,860 S | 2/2000 | Golichowski et al. | |
| 6,036,071 A | 3/2000 | Hartmann et al. | |
| 6,050,660 A | 4/2000 | Gurley | |
| 6,082,539 A | 7/2000 | Lee | |
| 6,082,687 A | 7/2000 | Kump et al. | |
| 6,085,925 A | 7/2000 | Chung | |
| 6,098,858 A | 8/2000 | Laugesen | |
| 6,109,627 A | 8/2000 | Be | |
| 6,123,344 A * | 9/2000 | Clegg | B62B 1/14 280/47.26 |
| 6,131,926 A | 10/2000 | Harlan | |
| 6,132,819 A | 10/2000 | Ober et al. | |
| 6,176,558 B1 | 1/2001 | Hlade et al. | |
| 6,176,559 B1 | 1/2001 | Tiramani et al. | |
| D437,484 S | 2/2001 | Tiramani et al. | |
| D437,669 S | 2/2001 | Blason et al. | |
| 6,305,498 B1 | 10/2001 | Itzkovitch | |
| 6,311,881 B1 | 11/2001 | Kamiya | |
| 6,347,847 B1 | 2/2002 | Tiramani et al. | |
| 6,354,759 B1 | 3/2002 | Leicht | |
| 6,367,631 B1 | 4/2002 | Steigerwald | |
| 6,371,320 B2 | 4/2002 | Sagol | |
| 6,371,321 B1 | 4/2002 | Lee | |
| 6,371,424 B1 | 4/2002 | Shaw | |
| D456,972 S | 5/2002 | Blason et al. | |
| 6,431,580 B1 | 8/2002 | Kady | |
| 6,497,395 B1 | 12/2002 | Croker | |
| 6,547,347 B2 | 4/2003 | Saito et al. | |
| 6,601,930 B2 | 8/2003 | Tiramani et al. | |
| 6,619,772 B2 | 9/2003 | Dierbeck | |
| 6,637,707 B1 | 10/2003 | Gates et al. | |
| 6,641,013 B2 | 11/2003 | Dise | |
| 6,666,362 B1 | 12/2003 | Letrudet | |
| 6,889,838 B2 | 5/2005 | Meier et al. | |
| 6,945,546 B2 | 9/2005 | Guirlinger | |
| 6,948,691 B2 | 9/2005 | Brock et al. | |

(56) References Cited

U.S. PATENT DOCUMENTS

| | | | |
|---|---|---|---|
| 6,983,946 B2 | 1/2006 | Sullivan et al. | |
| 7,007,903 B2 | 3/2006 | Turner | |
| 7,044,484 B2 | 5/2006 | Wang | |
| 7,063,496 B2 * | 6/2006 | Jackson | B62B 3/08 414/532 |
| 7,066,475 B2 | 6/2006 | Barnes | |
| 7,077,372 B2 | 7/2006 | Moran | |
| D525,789 S | 8/2006 | Hosking | |
| D527,225 S | 8/2006 | Krieger et al. | |
| 7,083,061 B2 | 8/2006 | Spindel et al. | |
| 7,090,085 B1 | 8/2006 | Vicendese et al. | |
| 7,121,417 B2 | 10/2006 | Magnusson et al. | |
| 7,147,243 B2 | 12/2006 | Kady | |
| 7,152,752 B2 | 12/2006 | Kurtenbach | |
| D536,580 S | 2/2007 | Krieger et al. | |
| 7,172,164 B2 | 2/2007 | Fuelling et al. | |
| 7,219,969 B2 | 5/2007 | Bezzubov | |
| D545,697 S | 7/2007 | Martin | |
| 7,263,742 B2 | 9/2007 | Valentini | |
| 7,350,648 B2 | 4/2008 | Gerstner et al. | |
| 7,367,571 B1 | 5/2008 | Nichols | |
| 7,416,193 B1 | 8/2008 | Barnett | |
| 7,431,172 B1 | 10/2008 | Spindel et al. | |
| 7,448,115 B2 | 11/2008 | Howell et al. | |
| 7,490,800 B2 | 2/2009 | Tu | |
| 7,503,569 B2 | 3/2009 | Duvigneau | |
| 7,658,887 B2 | 2/2010 | Hovatter | |
| 7,690,856 B2 | 4/2010 | Mortensen | |
| 7,757,913 B2 | 7/2010 | Fichera | |
| 7,779,764 B2 | 8/2010 | Naidu et al. | |
| 7,780,026 B1 | 8/2010 | Zuckerman | |
| D627,967 S | 11/2010 | Kuhls | |
| 7,837,165 B2 | 11/2010 | Stone | |
| 7,841,144 B2 | 11/2010 | Pervan | |
| D630,851 S | 1/2011 | Landau et al. | |
| 8,028,845 B2 | 10/2011 | Himes | |
| D649,350 S | 11/2011 | Shitrit | |
| D649,783 S | 12/2011 | Brunner | |
| D653,832 S | 2/2012 | Vilkomirski et al. | |
| 8,132,819 B2 | 3/2012 | Landau et al. | |
| 8,177,463 B2 | 5/2012 | Walker | |
| D661,858 S | 6/2012 | Lifshitz et al. | |
| 8,191,910 B2 | 6/2012 | Landau et al. | |
| D663,952 S | 7/2012 | Crevling, Jr. et al. | |
| D664,354 S | 7/2012 | Crevling, Jr. et al. | |
| D668,869 S | 10/2012 | Yamamoto et al. | |
| 8,292,244 B2 | 10/2012 | Okada | |
| D674,605 S | 1/2013 | Vilkomirski et al. | |
| 8,448,829 B2 | 5/2013 | Watanabe | |
| 8,454,033 B2 | 6/2013 | Tsai | |
| 8,459,495 B2 | 6/2013 | Koenig et al. | |
| 8,505,729 B2 | 8/2013 | Sosnovsky et al. | |
| 8,567,796 B2 | 10/2013 | Bar-Erez et al. | |
| 8,590,704 B2 | 11/2013 | Koenig et al. | |
| 8,602,217 B2 | 12/2013 | Sosnovsky et al. | |
| 8,640,913 B2 | 2/2014 | Berendes | |
| 8,657,307 B2 | 2/2014 | Lifshitz et al. | |
| 8,677,661 B2 | 3/2014 | Michels et al. | |
| D701,696 S | 4/2014 | Shitrit et al. | |
| 8,689,396 B2 | 4/2014 | Wolfe et al. | |
| 8,714,355 B2 | 5/2014 | Huang | |
| 8,813,960 B2 | 8/2014 | Fjelland | |
| 8,844,949 B2 * | 9/2014 | White | B62B 3/027 280/646 |
| 8,851,282 B2 | 10/2014 | Brunner | |
| 8,875,888 B2 | 11/2014 | Koenig et al. | |
| 8,894,160 B1 | 11/2014 | Christensen | |
| 8,924,752 B1 | 12/2014 | Law et al. | |
| 8,925,752 B2 | 1/2015 | Smith | |
| 8,974,139 B2 | 3/2015 | Saul | |
| 8,979,100 B2 | 3/2015 | Bensman et al. | |
| 8,985,922 B2 | 3/2015 | Neumann | |
| 9,089,964 B2 | 7/2015 | Cheng | |
| D738,105 S | 9/2015 | Shitrit | |
| D738,106 S | 9/2015 | Shitrit | |
| D738,622 S | 9/2015 | Sabbag et al. | |
| 9,132,543 B2 | 9/2015 | Bar-Erez et al. | |
| D753,394 S | 4/2016 | Brunner | |
| D753,395 S | 4/2016 | Brunner | |
| D753,396 S | 4/2016 | Brunner | |
| D753,982 S | 4/2016 | Guirlinger | |
| D765,974 S | 9/2016 | Tonelli et al. | |
| 9,447,804 B2 | 9/2016 | Andersson et al. | |
| D770,179 S | 11/2016 | Menirom | |
| 9,506,489 B2 | 11/2016 | Ko | |
| 9,511,491 B2 | 12/2016 | Brunner | |
| D777,426 S | 1/2017 | Dahl | |
| 9,551,367 B1 | 1/2017 | Shieh | |
| 9,566,990 B2 | 2/2017 | Bar-Erez et al. | |
| D784,089 S | 4/2017 | Furneaux et al. | |
| 9,616,562 B2 | 4/2017 | Hoppe et al. | |
| 9,643,629 B2 | 5/2017 | Bar-Erez et al. | |
| D790,221 S | 6/2017 | Yahav et al. | |
| 9,701,443 B2 | 7/2017 | Wang | |
| 9,725,209 B1 | 8/2017 | Ben-Gigi | |
| 9,776,651 B2 | 10/2017 | Huang | |
| D803,631 S | 11/2017 | Min et al. | |
| 9,850,029 B2 | 12/2017 | Brunner | |
| D806,483 S | 1/2018 | Stanford et al. | |
| 9,872,562 B1 | 1/2018 | Brunner | |
| 9,888,752 B2 | 2/2018 | Den Boer et al. | |
| D814,187 S | 4/2018 | Caglar | |
| D815,831 S | 4/2018 | Tonelli | |
| 9,950,724 B2 * | 4/2018 | Huisman | B62B 1/14 |
| D816,334 S | 5/2018 | Brunner | |
| 10,017,134 B2 | 7/2018 | Pickens et al. | |
| D826,510 S | 8/2018 | Brunner | |
| RE47,022 E | 9/2018 | Sosnovsky et al. | |
| D828,671 S | 9/2018 | Cope et al. | |
| D831,352 S | 10/2018 | Brunner | |
| 10,106,180 B2 | 10/2018 | Bar-Erez et al. | |
| D833,744 S | 11/2018 | Yahav et al. | |
| D836,995 S | 1/2019 | Carey et al. | |
| D837,515 S | 1/2019 | Shpitzer | |
| D839,681 S | 2/2019 | Evron et al. | |
| 10,222,172 B2 | 3/2019 | Melville | |
| D845,080 S | 4/2019 | Jacobsen et al. | |
| D845,081 S | 4/2019 | Jacobsen | |
| 10,336,359 B1 | 7/2019 | Asbille | |
| D857,387 S | 8/2019 | Shpitzer | |
| 10,406,387 B2 | 9/2019 | Krepel et al. | |
| 10,434,638 B1 | 10/2019 | Tsai | |
| D871,013 S | 12/2019 | Liu | |
| D873,085 S | 1/2020 | Defrancia | |
| D876,833 S | 3/2020 | Brunner et al. | |
| 10,583,962 B2 | 3/2020 | Brunner | |
| 10,593,962 B2 | 3/2020 | Herchen et al. | |
| 10,603,783 B2 | 3/2020 | Brocket et al. | |
| D880,252 S | 4/2020 | Jacobsen | |
| D880,951 S | 4/2020 | Jacobsen | |
| D883,752 S | 5/2020 | Carey et al. | |
| D887,788 S | 6/2020 | Meda et al. | |
| D888,422 S | 6/2020 | Yang | |
| D888,503 S | 6/2020 | Meda et al. | |
| D891,193 S | 7/2020 | Stanford et al. | |
| D891,195 S | 7/2020 | Zhou | |
| 10,703,534 B2 | 7/2020 | Brunner et al. | |
| D891,875 S | 8/2020 | Olson | |
| D892,565 S | 8/2020 | Astle et al. | |
| D895,375 S | 8/2020 | Astle et al. | |
| 10,750,833 B2 | 8/2020 | Burchia | |
| D895,966 S | 9/2020 | Brunner | |
| D895,967 S | 9/2020 | Brunner | |
| D896,517 S | 9/2020 | Brunner et al. | |
| D896,518 S | 9/2020 | Brunner et al. | |
| D897,103 S | 9/2020 | Brunner | |
| 10,758,065 B2 | 9/2020 | Penalver, Jr. | |
| D898,320 S | 10/2020 | Brunner et al. | |
| 10,793,172 B2 | 10/2020 | Brunner | |
| 10,829,268 B2 | 11/2020 | Sommer | |
| 10,829,269 B2 | 11/2020 | Gonitianer et al. | |
| 10,894,314 B2 | 1/2021 | Hocine et al. | |
| 10,933,501 B2 | 3/2021 | Bisson | |
| 10,962,218 B2 | 3/2021 | Plato | |

(56) References Cited

U.S. PATENT DOCUMENTS

| | | | |
|---|---|---|---|
| 10,981,696 | B2 | 4/2021 | Brunner et al. |
| D917,977 | S | 5/2021 | Brunner et al. |
| D918,584 | S | 5/2021 | Brunner et al. |
| D919,296 | S | 5/2021 | Brunner et al. |
| 11,008,136 | B2 | 5/2021 | Brunner et al. |
| D920,671 | S | 6/2021 | Brunner et al. |
| 11,027,883 | B1 | 6/2021 | Brunner et al. |
| D923,935 | S | 7/2021 | Brunner et al. |
| 11,059,631 | B1 | 7/2021 | Brunner et al. |
| 11,066,089 | B2 | 7/2021 | Brunner |
| 11,124,347 | B2 | 9/2021 | Chen |
| D932,186 | S | 10/2021 | Brunner et al. |
| 11,155,382 | B1 | 10/2021 | Cai |
| D936,030 | S | 11/2021 | Lee et al. |
| 11,192,690 | B1 | 12/2021 | Brunner et al. |
| D941,020 | S | 1/2022 | Brunner et al. |
| 11,230,410 | B2 | 1/2022 | Brunner |
| 11,253,037 | B2 | 2/2022 | Bomer |
| 11,283,117 | B2 | 3/2022 | Polakowski et al. |
| 11,338,959 | B2 | 5/2022 | Hoppe et al. |
| 11,365,026 | B2 | 6/2022 | Brunner et al. |
| 11,385,055 | B2 | 7/2022 | Millane |
| 11,426,859 | B2 | 8/2022 | Squiers et al. |
| D967,693 | S | 10/2022 | Brunner et al. |
| 11,464,335 | B2 | 10/2022 | Brunner et al. |
| 11,510,486 | B2 | 11/2022 | Adams |
| 11,529,985 | B2 | 12/2022 | Brunner et al. |
| 11,530,716 | B2 | 12/2022 | Bastian et al. |
| 11,554,898 | B2 | 1/2023 | Brunner et al. |
| 11,612,998 | B1 | 3/2023 | Byington |
| 2002/0000440 | A1 | 1/2002 | Sagol |
| 2002/0030425 | A1 | 3/2002 | Tiramani et al. |
| 2002/0125072 | A1 | 9/2002 | Levy |
| 2002/0171228 | A1 | 11/2002 | Kady |
| 2003/0075468 | A1 | 4/2003 | Story et al. |
| 2003/0094392 | A1 | 5/2003 | Meier et al. |
| 2003/0094393 | A1 | 5/2003 | Sahm |
| 2003/0115715 | A1 | 6/2003 | Valentini |
| 2003/0146589 | A1 | 8/2003 | Jarko et al. |
| 2003/0184034 | A1* | 10/2003 | Pfeiffer ............... A45C 13/385 280/47.29 |
| 2003/0205877 | A1 | 11/2003 | Verna et al. |
| 2004/0074725 | A1 | 4/2004 | Shih |
| 2004/0103494 | A1 | 6/2004 | Valentini |
| 2004/0149754 | A1 | 8/2004 | Diamant |
| 2004/0195793 | A1 | 10/2004 | Sullivan et al. |
| 2004/0206656 | A1 | 10/2004 | Dubois et al. |
| 2004/0256529 | A1 | 12/2004 | Richter |
| 2005/0015928 | A1 | 1/2005 | Arsenault et al. |
| 2005/0062244 | A1 | 3/2005 | Guirlinger |
| 2005/0082775 | A1 | 4/2005 | Slager |
| 2005/0104308 | A1 | 5/2005 | Barnes |
| 2005/0139745 | A1 | 6/2005 | Liao et al. |
| 2005/0242144 | A1 | 11/2005 | Panosian et al. |
| 2006/0006770 | A1 | 1/2006 | Valentini |
| 2006/0027475 | A1 | 2/2006 | Gleason et al. |
| 2006/0038367 | A9 | 2/2006 | Ferraro et al. |
| 2006/0076261 | A1 | 4/2006 | Kurtenbach |
| 2006/0113303 | A1 | 6/2006 | Huruta |
| 2006/0119060 | A1 | 6/2006 | Sullivan et al. |
| 2006/0165482 | A1 | 7/2006 | Olberding |
| 2006/0186624 | A1 | 8/2006 | Kady |
| 2006/0254946 | A1 | 11/2006 | Becklin |
| 2007/0006542 | A1 | 1/2007 | Duke |
| 2007/0012694 | A1 | 1/2007 | Duvigneau |
| 2007/0045505 | A1 | 3/2007 | Chen |
| 2007/0068757 | A1 | 3/2007 | Tan |
| 2007/0090616 | A1* | 4/2007 | Tompkins ............... B62B 1/14 280/47.28 |
| 2007/0138041 | A1 | 6/2007 | Welsh |
| 2007/0145700 | A1 | 6/2007 | Ambrose et al. |
| 2007/0194543 | A1 | 8/2007 | Duvigneau |
| 2007/0273114 | A1 | 11/2007 | Katz |
| 2008/0060953 | A1 | 3/2008 | Ghassan |
| 2008/0104921 | A1 | 5/2008 | Pervan et al. |
| 2008/0115312 | A1 | 5/2008 | DiPasquale et al. |
| 2008/0121547 | A1 | 5/2008 | Dur et al. |
| 2008/0134607 | A1 | 6/2008 | Pervan et al. |
| 2008/0136133 | A1 | 6/2008 | Takahashi |
| 2008/0169667 | A1 | 7/2008 | Siniarski et al. |
| 2008/0169739 | A1 | 7/2008 | Goldenberg |
| 2008/0271280 | A1 | 11/2008 | Tiede et al. |
| 2008/0277221 | A1 | 11/2008 | Josefson et al. |
| 2008/0280523 | A1 | 11/2008 | Bishop |
| 2008/0296443 | A1 | 12/2008 | Lunitz et al. |
| 2008/0308369 | A1 | 12/2008 | Louis, Sr. |
| 2009/0026901 | A1 | 1/2009 | Nies, III et al. |
| 2009/0044827 | A1 | 2/2009 | Zilber et al. |
| 2009/0071990 | A1 | 3/2009 | Jardine et al. |
| 2009/0127146 | A1 | 5/2009 | Krebs et al. |
| 2009/0145790 | A1 | 6/2009 | Panosian et al. |
| 2009/0145866 | A1 | 6/2009 | Panosian et al. |
| 2009/0145913 | A1 | 6/2009 | Panosian et al. |
| 2009/0178946 | A1 | 7/2009 | Patsone et al. |
| 2009/0236482 | A1 | 9/2009 | Winig et al. |
| 2009/0288970 | A1 | 11/2009 | Katz et al. |
| 2010/0052276 | A1 | 3/2010 | Brunner |
| 2010/0139566 | A1 | 6/2010 | Lopuszanski |
| 2010/0147642 | A1 | 6/2010 | Andochick |
| 2010/0176261 | A1 | 7/2010 | Chen et al. |
| 2010/0219193 | A1 | 9/2010 | Becklin |
| 2010/0224528 | A1 | 9/2010 | Madsen |
| 2010/0254757 | A1 | 10/2010 | Saul |
| 2010/0290877 | A1 | 11/2010 | Landau et al. |
| 2011/0049824 | A1 | 3/2011 | Bar-Erez et al. |
| 2011/0073516 | A1 | 3/2011 | Zelinskiy |
| 2011/0127736 | A1 | 6/2011 | Oliver |
| 2011/0139665 | A1 | 6/2011 | Madsen |
| 2011/0139777 | A1 | 6/2011 | Sosnovsky et al. |
| 2011/0155613 | A1 | 6/2011 | Koenig et al. |
| 2011/0174939 | A1 | 7/2011 | Taylor |
| 2011/0181008 | A1 | 7/2011 | Bensman et al. |
| 2011/0220531 | A1 | 9/2011 | Meether et al. |
| 2012/0073995 | A1 | 3/2012 | Parker |
| 2012/0074022 | A1 | 3/2012 | McTavish |
| 2012/0074158 | A1 | 3/2012 | Lafleur |
| 2012/0080432 | A1 | 4/2012 | Bensman et al. |
| 2012/0152800 | A1 | 6/2012 | Parzy et al. |
| 2012/0152944 | A1 | 6/2012 | Mlkomirski et al. |
| 2012/0160886 | A1* | 6/2012 | Henny ................ B62B 1/14 224/401 |
| 2012/0180250 | A1 | 7/2012 | Ricklefsen et al. |
| 2012/0207571 | A1 | 8/2012 | Scott |
| 2012/0292213 | A1 | 11/2012 | Brunner |
| 2012/0326406 | A1 | 12/2012 | Lifshitz et al. |
| 2013/0024468 | A1 | 1/2013 | Kocsis |
| 2013/0031731 | A1 | 2/2013 | Hess |
| 2013/0031732 | A1 | 2/2013 | Hess et al. |
| 2013/0068903 | A1 | 3/2013 | O'Keene |
| 2013/0121783 | A1 | 5/2013 | Kelly |
| 2013/0127129 | A1 | 5/2013 | Bensman et al. |
| 2013/0146551 | A1 | 6/2013 | Simpson et al. |
| 2013/0154315 | A1 | 6/2013 | Tiilikaninen |
| 2013/0206139 | A1 | 8/2013 | Krepel et al. |
| 2013/0223971 | A1* | 8/2013 | Grace, IV .............. B62B 1/14 414/809 |
| 2013/0239509 | A1 | 9/2013 | Wang |
| 2014/0062042 | A1 | 3/2014 | Wagner et al. |
| 2014/0069832 | A1 | 3/2014 | Roehm |
| 2014/0076759 | A1 | 3/2014 | Roehm et al. |
| 2014/0123478 | A1 | 5/2014 | Gylander et al. |
| 2014/0161518 | A1 | 6/2014 | Ko |
| 2014/0166516 | A1 | 6/2014 | Martinez et al. |
| 2014/0197059 | A1 | 7/2014 | Evans et al. |
| 2014/0205373 | A1 | 7/2014 | Andersson et al. |
| 2015/0014949 | A1 | 1/2015 | Dittman |
| 2015/0034515 | A1 | 2/2015 | Monyak et al. |
| 2015/0151427 | A1 | 6/2015 | Ben-Gigi |
| 2015/0274362 | A1 | 10/2015 | Christopher et al. |
| 2015/0310842 | A1 | 10/2015 | Coburn et al. |
| 2015/0376917 | A1 | 12/2015 | Brunner |
| 2016/0023349 | A1 | 1/2016 | Hoppe et al. |
| 2016/0130034 | A1 | 5/2016 | Kuhls et al. |
| 2016/0144500 | A1 | 5/2016 | Chen |

(56) References Cited

U.S. PATENT DOCUMENTS

| | | |
|---|---|---|
| 2016/0168880 A1 | 6/2016 | Phelan |
| 2016/0213115 A1 | 7/2016 | Gonitianer et al. |
| 2016/0221177 A1 | 8/2016 | Reinhart |
| 2017/0065355 A1 | 3/2017 | Ross et al. |
| 2017/0098513 A1 | 4/2017 | Horváth et al. |
| 2017/0120679 A1 | 5/2017 | Naiva |
| 2017/0121056 A1 | 5/2017 | Wang |
| 2017/0138382 A1 | 5/2017 | Ko |
| 2017/0143090 A1 | 5/2017 | Naiva |
| 2017/0158216 A1 | 6/2017 | Yahav et al. |
| 2017/0165828 A1 | 6/2017 | Fleischmann |
| 2017/0166352 A1* | 6/2017 | Hoppe .................. B25H 3/022 |
| 2017/0174392 A1 | 6/2017 | De Loynes |
| 2017/0217464 A1 | 8/2017 | Bar-Erez et al. |
| 2017/0239808 A1 | 8/2017 | Hoppe et al. |
| 2017/0257958 A1 | 9/2017 | Sabbag et al. |
| 2017/0266804 A1 | 9/2017 | Kinskey |
| 2017/0318927 A1 | 11/2017 | Kraus et al. |
| 2017/0349013 A1 | 12/2017 | Gronholm |
| 2018/0000234 A1 | 1/2018 | White |
| 2018/0031019 A1 | 2/2018 | Sjöstedt et al. |
| 2018/0044059 A1 | 2/2018 | Brunner |
| 2018/0099405 A1 | 4/2018 | Reinhart |
| 2018/0127007 A1 | 5/2018 | Kravchenko |
| 2018/0153312 A1 | 6/2018 | Buck et al. |
| 2018/0161975 A1 | 6/2018 | Brunner |
| 2018/0186513 A1 | 7/2018 | Brunner |
| 2018/0213934 A1 | 8/2018 | Wolle et al. |
| 2018/0220758 A1 | 8/2018 | Burchia |
| 2018/0229889 A1 | 8/2018 | Li |
| 2018/0290288 A1 | 10/2018 | Brunner |
| 2019/0001482 A1 | 1/2019 | Wolle et al. |
| 2019/0002004 A1 | 1/2019 | Brunner |
| 2019/0031222 A1 | 1/2019 | Takyar et al. |
| 2019/0039781 A1 | 2/2019 | Kogel et al. |
| 2019/0106244 A1* | 4/2019 | Brunner .................. A45C 7/005 |
| 2019/0168376 A1 | 6/2019 | Brocket et al. |
| 2019/0225371 A1 | 7/2019 | Hoppe et al. |
| 2019/0225374 A1 | 7/2019 | McCrea et al. |
| 2020/0029543 A1 | 1/2020 | Householder |
| 2020/0055534 A1 | 2/2020 | Hassell |
| 2020/0063776 A1 | 2/2020 | Bastian et al. |
| 2020/0078929 A1 | 3/2020 | Liu |
| 2020/0146447 A1 | 5/2020 | Brendel et al. |
| 2020/0147781 A1 | 5/2020 | Squiers |
| 2020/0165036 A1 | 5/2020 | Squiers |
| 2020/0223585 A1 | 7/2020 | Brunner et al. |
| 2020/0243925 A1 | 7/2020 | Polakowski et al. |
| 2020/0299027 A1 | 9/2020 | Brunner et al. |
| 2020/0346819 A1 | 11/2020 | Kogel |
| 2020/0038350 A1 | 12/2020 | Cox |
| 2020/0383507 A1 | 12/2020 | Cox |
| 2021/0025706 A1 | 1/2021 | Millane |
| 2021/0031975 A1 | 2/2021 | Brunner |
| 2021/0039831 A1 | 2/2021 | Brunner |
| 2021/0094600 A1 | 4/2021 | Brunner et al. |
| 2021/0104909 A1 | 4/2021 | Mantych |
| 2021/0104914 A1 | 4/2021 | Cholst |
| 2021/0154824 A1 | 5/2021 | Barton |
| 2021/0155373 A1 | 5/2021 | Cai |
| 2021/0187725 A1 | 6/2021 | Brunner |
| 2021/0221561 A1 | 7/2021 | Davidian et al. |
| 2021/0267368 A1 | 9/2021 | Bruins |
| 2021/0316909 A1 | 10/2021 | Vargo et al. |
| 2021/0360803 A1 | 11/2021 | Semon et al. |
| 2022/0097926 A1 | 3/2022 | Whitmire et al. |
| 2022/0117393 A1 | 4/2022 | Jenkins et al. |
| 2022/0240671 A1 | 8/2022 | Blumenthal et al. |
| 2022/0258324 A1 | 8/2022 | Blumenthal et al. |
| 2022/0369781 A1 | 11/2022 | Brunner et al. |
| 2022/0402113 A1 | 12/2022 | Brunner et al. |
| 2023/0027343 A1 | 1/2023 | Zheng et al. |
| 2023/0036215 A1 | 2/2023 | Williams et al. |
| 2023/0136626 A1 | 5/2023 | Cai et al. |

FOREIGN PATENT DOCUMENTS

| | | | | |
|---|---|---|---|---|
| CN | 2782508 | Y | 5/2006 | |
| CN | 200947356 | Y | 9/2007 | |
| CN | 101068661 | A | 11/2007 | |
| CN | 101821148 | A | 9/2010 | |
| CN | 101837854 | A | 9/2010 | |
| CN | 102042354 | A | 5/2011 | |
| CN | 102137795 | A | 7/2011 | |
| CN | 102248523 | A | 11/2011 | |
| CN | 102469899 | A | 5/2012 | |
| CN | 202264971 | U | 6/2012 | |
| CN | 101362464 | B | 7/2012 | |
| CN | 102608238 | A | 7/2012 | |
| CN | 102834035 | A | 12/2012 | |
| CN | 302371147 | S | 3/2013 | |
| CN | 103118578 | A | 5/2013 | |
| CN | 103659777 | A | 3/2014 | |
| CN | 102186714 | B | 1/2015 | |
| CN | 204161752 | U | 2/2015 | |
| CN | 107249378 | A | 10/2017 | |
| CN | 107428436 | A | 12/2017 | |
| DE | 3510307 | A1 | 9/1986 | |
| DE | 9313802 | U1 | 12/1993 | |
| DE | 4415638 | A1 | 11/1995 | |
| DE | 29708343 | U1 | 7/1997 | |
| DE | 19750543 | A1 | 5/1999 | |
| DE | 20218996 | U1 | 3/2003 | |
| DE | 102004057870 | A1 | 6/2006 | |
| DE | 202011002617 | U1 | 4/2011 | |
| DE | 102010003754 | A1 | 10/2011 | |
| DE | 102010003756 | A1 | 10/2011 | |
| DE | 102012106482 | A1 | 1/2014 | |
| DE | 102012220837 | A1 | 5/2014 | |
| DE | 202014103695 | U1 | 12/2014 | |
| DE | 202015105053 | U1 | 10/2016 | |
| DE | 202015005752 | U1 | 11/2016 | |
| DE | 102015112204 | A1 | 2/2017 | |
| DE | 102015113053 | A1 | 4/2017 | |
| DE | 402018201520 | | 11/2018 | |
| EM | 000705231-0001 | | 4/2007 | |
| EM | 002419283-0001 | | 3/2014 | |
| EP | 0 916 302 | A2 | 5/1999 | |
| EP | 0916302 | A2 | 5/1999 | |
| EP | 1321247 | A2 | 6/2003 | |
| EP | 1428764 | B1 | 6/2006 | |
| EP | 1819487 | A1 | 8/2007 | |
| EP | 1925406 | A1 | 5/2008 | |
| EP | 2 289 671 | A2 | 3/2011 | |
| EP | 2289671 | A2 * | 3/2011 | ............ A47B 47/00 |
| EP | 2346741 | A1 | 7/2011 | |
| EP | 2456341 | A1 | 5/2012 | |
| EP | 2 543 297 | A2 | 1/2013 | |
| EP | 2555660 | A2 | 2/2013 | |
| EP | 2555661 | A1 | 2/2013 | |
| EP | 2805799 | A2 | 11/2014 | |
| EP | 3141354 | A1 | 3/2017 | |
| FR | 3 043 970 | A | 5/2017 | |
| GB | 694707 | A | 7/1953 | |
| GB | 2047181 | B | 2/1983 | |
| GB | 2110076 | A | 6/1983 | |
| GB | 2330521 | A | 4/1999 | |
| GB | 2406331 | A | 3/2005 | |
| GB | 2413265 | A | 10/2005 | |
| GB | 2449934 | A | 12/2008 | |
| JP | 2003194020 | A | 7/2003 | |
| JP | D1180963 | S | 8/2003 | |
| JP | 1276744 | S | 7/2006 | |
| JP | D1395115 | S | 8/2010 | |
| JP | D1395116 | S | 8/2010 | |
| JP | D1455321 | S | 11/2012 | |
| JP | 2013022972 | A | 2/2013 | |
| JP | 2013022976 | A | 2/2013 | |
| JP | 1477050 | S | 8/2013 | |
| JP | 2014-117961 | A | 6/2014 | |
| JP | D1503434 | S | 7/2014 | |
| JP | D1625407 | S | 2/2019 | |
| JP | D1665028 | S | 8/2020 | |
| KR | 300271616 | | 2/2000 | |

(56) References Cited

FOREIGN PATENT DOCUMENTS

| | | |
|---|---|---|
| KR | 300320243 | 6/2002 |
| KR | 300806604 | 7/2015 |
| KR | 300842236 | 3/2016 |
| KR | 300849600 | 4/2016 |
| KR | 300859965 | 6/2016 |
| KR | 3008881296 | 11/2016 |
| KR | 300999599 | 3/2019 |
| TW | I324578 B | 5/2010 |
| TW | D135074 S | 6/2010 |
| TW | D168686 S | 7/2015 |
| TW | D174412 S1 | 3/2016 |
| TW | D192092 | 8/2018 |
| TW | D206875 | 9/2020 |
| WO | 2005045886 A2 | 5/2005 |
| WO | 2006099638 A1 | 9/2006 |
| WO | 2007121745 A1 | 11/2007 |
| WO | 2007121746 A2 | 11/2007 |
| WO | 2008/090546 A1 | 7/2008 |
| WO | 2009140965 A1 | 11/2009 |
| WO | 2011/000387 A1 | 1/2011 |
| WO | 2011009480 A1 | 1/2011 |
| WO | 2011/032568 A1 | 3/2011 |
| WO | 2013026084 A1 | 2/2013 |
| WO | 2014125488 A2 | 8/2014 |
| WO | 2016142935 A1 | 9/2016 |
| WO | 2016/187652 A1 | 12/2016 |
| WO | 2017028845 A1 | 2/2017 |
| WO | 2017098513 A1 | 6/2017 |
| WO | 2017/191628 A1 | 11/2017 |
| WO | WO-2017191628 A1 * 11/2017 ............. A45C 13/02 |
| WO | 2017212840 A1 | 12/2017 |
| WO | 2018010859 A1 | 1/2018 |
| WO | 2018/213560 A1 | 11/2018 |
| WO | 2019/028041 A1 | 2/2019 |
| WO | 2019147801 A1 | 8/2019 |

OTHER PUBLICATIONS

AUER Packaging 1 2016 ("Auer-Catalog").
AUER Packaging 2 2016.
Amazon. Hopkins FloTool 91002 Thino Box with Mount, https://www.amazon.com/exec/obidos/ASIN/B003K15F31/20140000-20, accessed Jun. 17, 2019.
Batavia Gmbh. BluCave Storage System. https://protect-us.mimecast.com/s/5XIGCR6KypcgJnIKi9EDoim?domain=batavia.eu, accessed Jun. 17, 2019.
Batavia. BluCave Universal Storage System, https://batavia.eu/blucave-storage-system/, accessed Jun. 17, 2019.
BluCave Video?. https://www.youtube.com/watch?v=Sw7fQQPw0tY&feature=youtu.be&t=32.
Cain, Tristan. "Bird Balder, er—Builder." Brick Journal, Nov. 2013 (Issue 26), pp. 15-16.
"Cavity". Merriam-Webster's Collegiate Dictionary (11th Ed.), Merriam-Webster, Incorporated, 2020, p. 197.
Certified Translations of the Cover Pages of DE102015112204A1 and DE202015105053U1.
Final Rejection dated Nov. 28, 2018 in U.S. Appl. No. 15/826,201 (17 Pages).
Forum Post: Systainer clone (dated Feb. 15, 2016).
General Design Principles for DuPont Engineering Polymers, E.I. du Porn de Nemours and Company, 2000.
Get Tools Direct. TSTAC Vac Rack (Suits DWV902M & DWV900L) DwV9500-XJ, https://www.gettoolsdirect.com.au/dewalt-tstak-vac-rack-suits-dwv902m-and-dwv9001-dwv9500-xj.html, accessed Jun. 17, 2019.
International Search Report and Written Opinion for International Application No. PCT/US2018/044629, dated Jan. 9, 2019.
International Search Report and Written Opinion for International Application No. PCT/US2018/033161, dated Aug. 3, 2018 (14 pages).

ITS. Dewalt 171229 Dewalt TSTAK Carrier Trolley, https://www.its.co.uk/pd/171229-Dewalt-TSTAK-Carrier-Trolley-_DEW171229.htm, accessed Jun. 17, 2019.
Kazmer, David. "Design of Plastic Parts." Applied Plastics Engineering Handbook Processing and Materials, edited by Myer Kutz, Elsevier Inc., 2011, pp. 535-551.
Milwaukee Dolly, announced 2019 (online), (site visited Mar. 9, 2020). Available from internet, URL: https://www.zoro.com/milwaukee-tool-box-dolly-7-4164-h-18-2932-W-48-22-8410/i/G3958724/ (Year: 2019).
Messetermine 2016 (dated Feb. 18,2016), Wayback machine archive (dated Apr. 4, 2016), AUER Packaging 1111 In-and Ausland present (dated Feb. 2016), and photograph, with certified translations.
Neue Produktfamilie: Systemboxen Durchdacht, Komfortabfi Und in Wertigem Design (dated Oct. 19, 2015), Wayback machine archive (dated Dec. 16, 2015), AUER Packaging prSsentiert neue Produktfamilie Systernboxen (dated Sep. 2015), and images ("Auer-Press"), with certified translations.
Nugent, Paul. "Rotational Molding," Applied Plastics Engineering Handbook Processing and Materials, edited by Myer Kutz, Elsevier Inc., 2011, pp. 311-332.
Sortimo Logistbm Sortimo International GmbH, Mobile Sortimente, http://p125638.mittwaldserver.info/fileadmin/media/PDFs/Logistixx_Broschuere_DE_WEB.pdf, accessed Jun. 17, 2019.
'Structure Design', Design Solutions Guide, BASF Corporation. 2007.
The Greenhead. Blitz Box—Portable Storage Box/Shelf, https://www.thegreenhead.com/2013/03/blitz-box-portable-storage-box-shelf.php, accessed Jun. 17, 2019.
ToolGuyd. RYOBI ToolBlox Tool Cabinet System, https://toolguyd.com/ryobi-toolblox-cabinets/, accessed Jun. 17, 2019.
VERTAK. https://www.alibaba.com/product-detail/Vertak-global-patented-multi-funciton-portable_60217794260.html.
Wheel board, announced 2019 (online), (site visited Mar. 9, 2020). Available from internet, URL: https://www.gearooz.com accu-case-aca-wheel-board (Year: 2019).
Youtube. TSTAK Phase 2 Upgrades Video. https://www.youtube.com/watch?v=jb06y6J1dr4&feature=youtu.be&t=197, accessed Jun. 17, 2019.
Extended European search report for application No. 18892505.1 dated Sep. 17, 2021 (7 Pages).
International Search Report and Written Opinion for International Application No. PCT/US2019/014940, dated Jul. 26, 2019 (7 pages).
International Search Report for International Application No. PCT/IL2019/050689, dated Aug. 23, 2019 (21 pages).
International Search Report for International Application No. PCT/IL2020/050433, dated Jun. 21, 2020 (14 pages).
Inter Partes Review No. 2021-00373, "Petition for Inter Partes Review of U.S. Pat. No. 10,583,962" filed Jan. 5, 2021, 198 pages.
Exhibit 1001 in Petition for Inter Partes Review of U.S. Pat. No. 10,583,962, filed Jan. 5, 2021, 64 Pages.
Exhibit 1002 in Petition for Inter Partes Review of U.S. Pat. No. 10,583,962, filed Jan. 5, 2021, 75 Pages.
Exhibit 1003 in Petition for Inter Partes Review of U.S. Pat. No. 10,583,962, filed Jan. 5, 2021, 13 Pages.
Exhibit 1004 in Petition for Inter Partes Review of U.S. Pat. No. 10,583,962, filed Jan. 5, 2021, 18 Pages.
Exhibit 1005 in Petition for Inter Partes Review of U.S. Pat. No. 10,583,962, filed Jan. 5, 2021, 9 Pages.
Exhibit 1006 in Petition for Inter Partes Review of U.S. Pat. No. 10,583,962, filed Jan. 5, 2021, 176 Pages.
Exhibit 1007 in Petition for Inter Partes Review of U.S. Pat. No. 10,583,962, filed Jan. 5, 2021, 22 Pages.
Exhibit 1008 in Petition for Inter Partes Review of U.S. Pat. No. 10,583,962, filed Jan. 5, 2021, 6 Pages.
Exhibit 1009 in Petition for Inter Partes Review of U.S. Pat. No. 10,583,962, filed Jan. 5, 2021, 24 Pages.
Exhibit 1010 in Petition for Inter Partes Review of U.S. Pat. No. 10,583,962, filed Jan. 5, 2021, 19 Pages.
Exhibit 1011 in Petition for Inter Partes Review of U.S. Pat. No. 10,583,962, filed Jan. 5, 2021, 26 Pages.
Exhibit 1012 in Petition for Inter Partes Review of U.S. Pat. No. 10,583,962, filed Jan. 5, 2021, 3 Pages.

(56) References Cited

OTHER PUBLICATIONS

Exhibit 1013 in Petition for Inter Partes Review of U.S. Pat. No. 10,583,962, filed Jan. 5, 2021, 168 Pages.
Exhibit 1014 in Petition for Inter Partes Review of U.S. Pat. No. 10,583,962, filed Jan. 5, 2021, 481 Pages.
Exhibit 1015 in Petition for Inter Partes Review of U.S. Pat. No. 10,583,962, filed Jan. 5, 2021, 6 Pages.
Exhibit 1016 in Petition for Inter Partes Review of U.S. Pat. No. 10,583,962, filed Jan. 5, 2021, 242 Pages.
Exhibit 1017 in Petition for Inter Partes Review of U.S. Pat. No. 10,583,962, filed Jan. 5, 2021, 6 Pages.
Exhibit 1018 in Petition for Inter Partes Review of U.S. Pat. No. 10,583,962, filed Jan. 5, 2021, 250 Pages.
Exhibit 1019 in Petition for Inter Partes Review of U.S. Pat. No. 10,583,962, filed Jan. 5, 2021, 44 Pages.
Exhibit 1020 in Petition for Inter Partes Review of U.S. Pat. No. 10,583,962, filed Jan. 5, 2021, 5 Pages.
Exhibit 1021 in Petition for Inter Partes Review of U.S. Pat. No. 10,583,962, filed Jan. 5, 2021, 1 Pages.
Exhibit 1022 in Petition for Inter Partes Review of U.S. Pat. No. 10,583,962, filed Jan. 5, 2021, 1 Pages.
Exhibit 1023 in Petition for Inter Partes Review of U.S. Pat. No. 10,583,962, filed Jan. 5, 2021, 24 Pages.
Exhibit 1024 in Petition for Inter Partes Review of U.S. Pat. No. 10,583,962, filed Jan. 5, 2021, 28 Pages.
Final Rejection dated Nov. 28, 2018, in U.S. Appl. No. 15/826,232 (14 Pages).
Non-Final Rejection dated Jan. 24, 2019, in U.S. Appl. No. 16/216,724 (17 Pages).
Non-Final Rejection dated Apr. 12, 2018, in U.S. Appl. No. 15/826,201 (16 Pages).
Toolguyd, Sys-Cart Base, a Systainer Mounting Platform: wall and base support, 2014, 9 pages.

* cited by examiner

HAND TRUCK

TECHNOLOGICAL FIELD

The present disclosure concerns a hand truck. More particularly it is directed to a specialty hand truck configured for articulating different utility units thereto.

BACKGROUND ART

References considered to be relevant as background to the presently disclosed subject matter are listed below:
U.S. Pat. No. 7,044,484
U.S. Pat. No. 8,454,033
WO 2017/191628
U.S. Pat. No. 10,106,180

Acknowledgement of the above references herein is not to be inferred as meaning that these are in any way relevant to the patentability of the presently disclosed subject matter.

BACKGROUND

Hand trucks are well known in the art. These can be generally categorized into several categories, depending on the nature of load they are expected to transfer. One type of hand trucks is the so-called L-shaped hand truck, comprising a frame with one or more handles at one end, and wheels on the other end, and a short nose-plate (also referred to as a toe-plate or a ledge) configured for supporting a load underneath. L-shaped hand trucks are available also in several foldable versions, wherein the wheels and/or the ledge are foldable. Another type of hand trucks is the so-called convertible hand truck, convertible between at least an upright position and a horizontal position, with two or four wheels, suited for handling respective large/heavy loads. Other types of hand trucks are referred to as specialty hand trucks, and are typically designed with special load engaging arrangements (e.g. a barrel grip, a fork nose and the like).

Often, the terms hand trucks and dollies are interchangeably used. A load dolly is a flat, typically rectangular, wheeled platform, with a frame-shaped handle extending from the platform, the handle typically being foldable over the platform.

In spite of some differences between load-dollies and hand trucks, the term hand truck, as used herein, refers collectively to any type of load moving handcart.

U.S. Pat. No. 7,044,484 discloses a foldable hand truck comprising a folding anchor structure, a frame, a loading board, a wheel set and a handle, the loading board and the wheel set being driven simultaneously by a gear set to be folded on two sides of the frame, the handle being extendable and retractable on the frame; wherein the folding anchor structure mounted to an end portion of the handle, the folding anchor structure includes a latch lever to latch the loading board on one side of the frame in a folded and shrunk condition when the handle is retracted and to release the loading board in response to the handle being extended, wherein the latch lever of the folding anchor structure includes latches which are located at opposed sides of the handle and which engage opposed sides of a front end of the loading board U.S. Pat. No. 8,454,033 relates to a handcart composed of a main frame, four wheels properly assembled with a frame rod of the main frame, a grip, two positioning sleeves combined movably with the grip, and two joint assemblies installed between the main frame and the grip for changeably connecting the main frame with the grip. The grip together with the positioning sleeves can be aligned flat or become 90° relative to the main frame by means of the joint assemblies. Then the handcart can be transformed into a two-wheel handcart or a four-wheel one by handling the grip through movement of the pivotal bases of the joint assemblies.

WO 2017/191628 concerns a coupling mechanism for detachably attaching two or more utility modules to one another, utility assembles, mobile carriers and other attachable modules and articles.

U.S. Pat. No. 10,106,180 describes a transportable container that includes a container portion with an opening into an interior space; a lid for closing the opening; a handle for carrying the container; and a pivotable side latch, pivotally connected to the lid, moveable between a retaining position and a storage position. The pivotable side latch is configured to engage a retaining structure of another container when the pivotable side latch is in the retaining position, and configured to be in a depression of the lid when the pivotable side latch is in the storage position. With the container in an upright position, the pivotable side latch moves toward the depression when the pivotable side latch is released from the retaining position.

GENERAL DESCRIPTION

According to the present disclosure there is provided a hand truck comprising a frame, having a first end and a second end configured with a wheel set, and a ledge extending at said second end, wherein one or both of the frame and the ledge is configured with an articulation arrangement for detachably attaching thereto a utility unit, the articulation arrangement extending parallel to a plane of the respective frame or ledge.

As noted above, the term hand truck, as used herein, refers collectively to any type of load moving hand truck.

The term utility unit as used herein denotes any article of utility, either stationary of mobile, having a utility and being detachably attachable to other utility units. A utility unit according to the present disclosure can be, by way of example, any type of container, drawer shed, work surface, locomotion system, mounting system, and the like.

The term ledge as used herein denotes any sort of load bearing member of the hand truck, including flat or shaped plates, fork-type load bearing elements, and the like.

In a particular configuration of this disclosure, attaching a utility unit to the articulation arrangement takes place along a sliding path extending parallel to the plane of the respective frame or ledge According to a specific configuration of the disclosure, the articulation arrangement is a male-female type coupling arrangement, wherein one or both of the frame and the ledge is configured with a male coupler or a female coupler and is configured for detachably attaching thereto a utility unit configured with the other one of a male coupler or a female coupler.

The articulation arrangement of each of the frame and the ledge defines a utility unit articulation face, and according to a particular configuration, the articulation arrangement comprises at least one male coupler at one of the articulation face and a face of the utility unit, and a female coupler at the other one of the articulation face and a face of the utility unit, said female coupler having a depressed locking location configured with at least one locking rib extending above a depressed plain and along a sliding path, and having an open edge facing in a first sense (i.e. a first direction); said male coupler having a projecting locking location disposed in register with said depressed locking location and configured with at least one locking tongue extending along said engaging sliding path at a second sense (i.e. a second direction), opposite to said first sense, and configured for arresting engagement at a space between said locking rib and depressed plain.

The hand truck, according to a particular example of the disclosure, can be an L-shaped cart.

According to a specific example, the ledge can be pivotable between a first position at which it extends substantially normal to the frame and is configured for bearing loads, and a collapsed position at which it extends substantially against the frame at a stowed position.

The hand truck can comprise a secondary frame articulated to an opposite end of the ledge, said secondary frame can be fixed or pivotable with respect to the ledge.

Any one or more of the following features designs and configurations can be applied to a hand truck according to the present disclosures, independently or in various combinations thereof:
- The coupling arrangement can be a set of couplers or a unitary coupling;
- The coupling arrangement can be disposed on either or both of a front face and a rear face of the frame;
- The coupling arrangement can be disposed on either or both faces of the ledge;
- The coupling arrangement can be integral with the respective frame and ledge of the hand truck, or it can be integrated therewith;
- The female coupler can be configured at the top face of the articulation face, and the male coupler can be configured at the bottom face of the utility unit;
- The at least one locking rib can extend substantially parallel to the sliding path;
- The at least one locking rib can extend substantially perpendicular and intersect the sliding path;
- The female coupler can comprise a single locking rib extending at rear end of the depressed locking location and substantially perpendicular to the sliding path;
- The female coupler can comprise two locking ribs extending at side edges of the depressed locking location and disposed substantially parallel to the sliding path;
- The female coupler can comprise two locking ribs each extending at a respective side edge of two neighboring depressed locking locations, said locking ribs disposed substantially parallel to the sliding path;
- The coupling arrangement can be configured such that engaging the utility unit with the articulation face of the hand truck is facilitated by sliding the utility unit with respect to the utility unit articulation face along a sliding path defined by at least one of said at least one locking rib and said at least one locking tongue;
- The coupling arrangement can be configured for snap-type locking of a utility unit over the a utility unit articulation face;
- The coupling arrangement can further comprise a locking mechanism for preventing unintentional separation of the utility unit from the articulation face, while they are interlocked;
- The locking mechanism can comprise at one of a top face of the articulation face and a bottom face of the utility unit a locking latch arresting location, and the other one of said top face of the articulation face and a bottom face of the utility unit can comprise a locking member displaceable and disposed in register with said locking latch arresting location, wherein at a locked position the locking member is arrested by the corresponding locking latch arresting location, and further wherein disengaging the utility unit from the hand truck is facilitated by disengaging the at least one locking latch from the at least one locking latch arresting location;
- The locking mechanism of the coupling arrangement can further comprise a release latch for displacing the locking latch into disengagement from the locking latch arresting location;
- The locking mechanism of the coupling arrangement can be spring biased and configured for normally projecting from a face of the utility unit.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
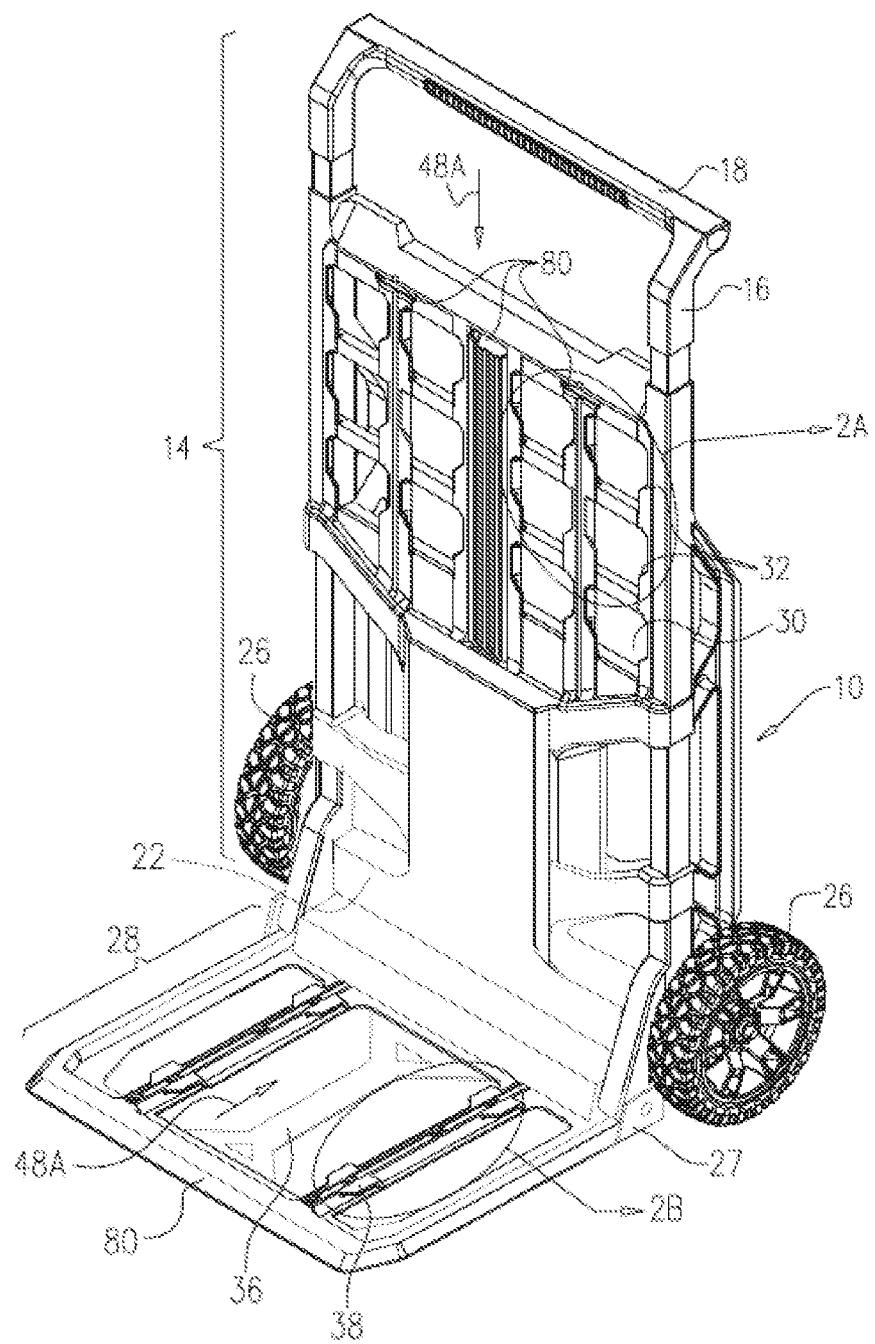
FIG. 1A illustrates an L-shaped hand truck, according to an example of the disclosure, the hand truck at an upright, deployed position.
Figure 1B:
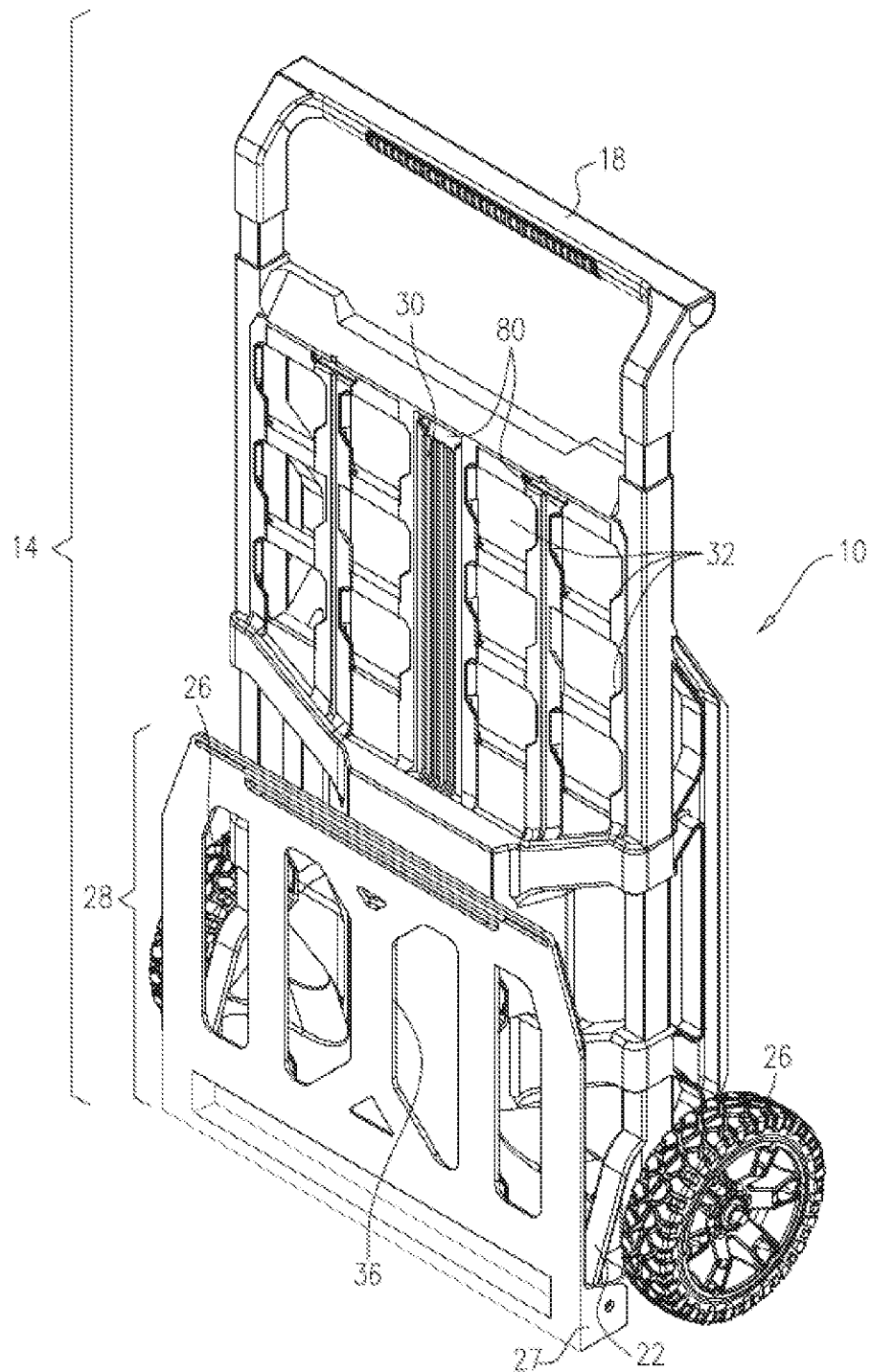
FIG. 1B illustrates the hand truck of FIG. 1A, at a folded position.

Attention is first directed to FIGS. 1A and 1B of the drawings, directed to a hand truck according to an example of the disclosure, generally designated 10. The hand truck 10 is a so-called "L-shaped hand truck", generally comprising an upright frame member 14 extending between a first, free end 16 comprising a bar-handle 18, and a second, bottom end 22, configured with a set of wheels 26. Pivotally articulated at 27 to the second end 22 there is a ledge 28, displaceable between a deployed position (FIG. 1A) where it is disposed at substantially right angle with respect to the frame 14, and a folded/collapsed/stowed position (FIG. 1B) at which the ledge 28 is disposed substantially parallel to the frame 14 and bears against it.

As for the set of wheels 26, it is noted that other locomotion arrangements can be utilized, such as triangularly disposed stair-climbing wheel sets, locomoting belt, and the like. The ledge 28 is exemplified herein as a flat planar load bearing member, however it is appreciated that a ledge can assume different configurations of load bearing elements, such as flat or shaped plates, fork-type load bearing elements, and the like.

Figure 2A:
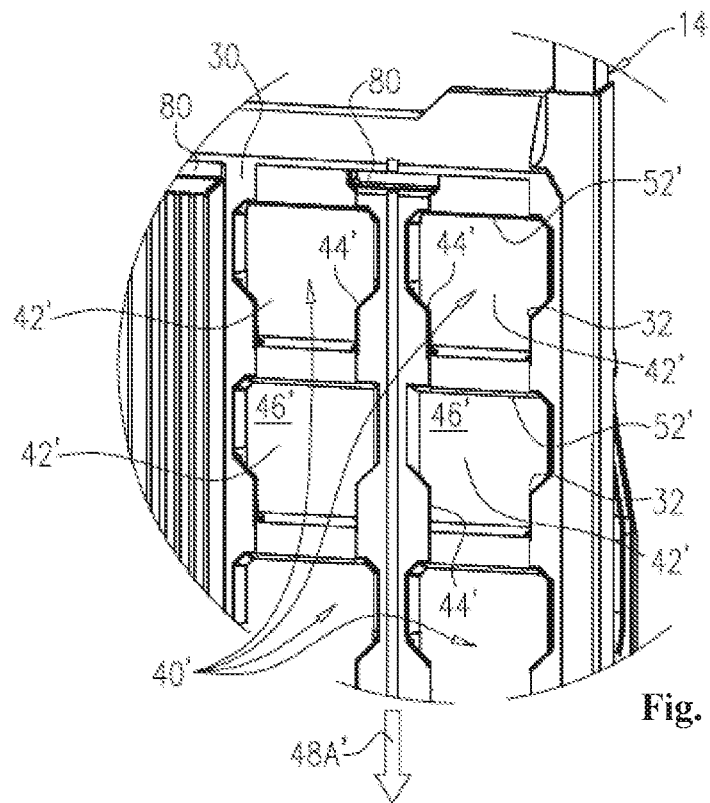
FIG. 2A is an enlarged view of the portion marked 2A in FIG. 1A, directed to a coupling arrangement.
Figure 2B:
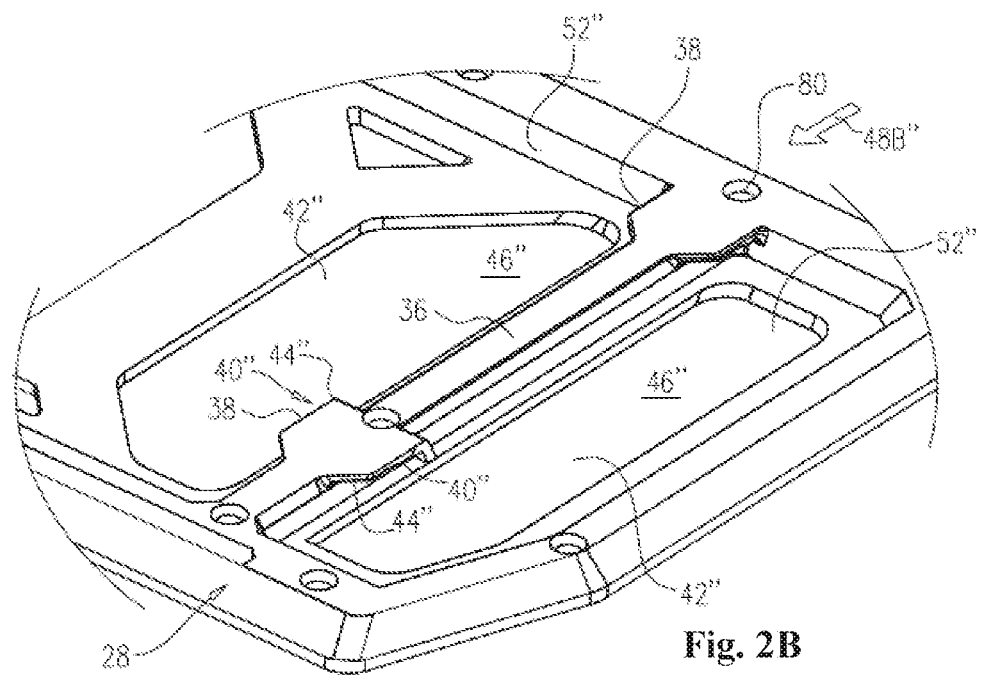
FIG. 2B is an enlarged view of the portion marked 2B in FIG. 1A, directed to a coupling arrangement.

In the illustrated example, the frame 14 is configured at a front face 30 thereof with an array of articulation arrangements 32 seen in greater detail in FIG. 2A, and the ledge 28 is configured at a top face 36 thereof with an array of articulation arrangements 38, seen in greater detail in FIG. 2B.

The front face 30 of the frame 14 and the top face 36 of the ledge 28 constitute, each, a utility unit articulation face. However, it is appreciated that according to other configurations (not shown), the rear face of the frame member and the bottom face of the ledge can as well be configured with articulation arrangements.

A particular example of an articulation arrangement is illustrated in the annexed drawings, though it should be appreciated that other articulation mechanisms can be used as well, however without departing from the scope of the disclosure.

With particular reference to FIGS. 2A and 2B, the articulation arrangement 32 and 38 of the frame 14 and the ledge 28, respectively, are exemplified, where the female articulation elements of the frame 14 are indexed (') and female articulation elements of the ledge 28 are indexed ("). The female articulation elements comprise a set of female coupling/articulation couplers 40, each comprising a depressed locking location 42 configured with at least one locking rib 44 extending above the depressed plain 46 and along a sliding path 48 (which is the orientation at which a utility unit is displaced during articulation, wherein 48A is the locking direction and 48B is the unlocking direction), and having an open edge 52 facing in a first sense along the sliding path 48. As can be seen, the sliding path 48 is parallel to a plane defined by the frame 14 or the ledge 28; thus, wherein attaching and detaching a utility unit to the articulation arrangement takes place along the sliding path, to the plane of the respective frame or ledge.

Figure 3A:
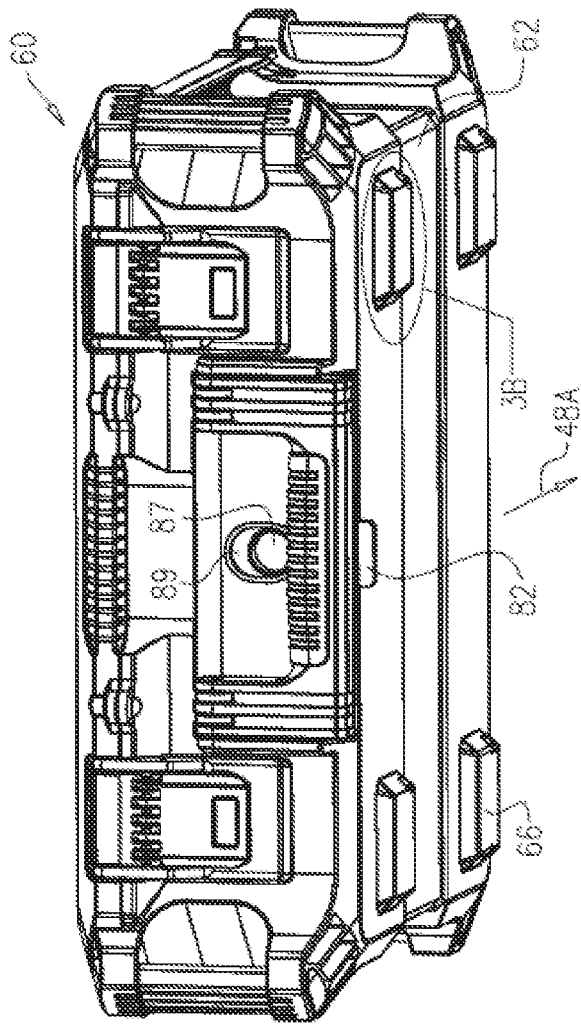
FIG. 3A is a perspective bottom view of a utility unit, namely a container, configured for articulation to the hand truck according to the disclosure.
Figure 3C:
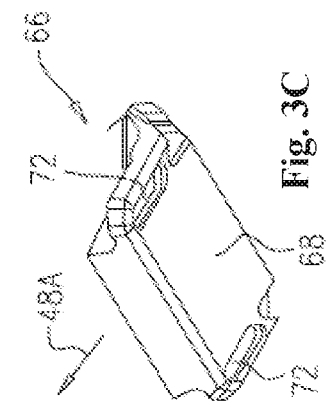
FIG. 3C is an opposite view of the coupling arrangement of FIG. 3B.
Figure 3B:
FIG. 3B is an enlarged view of the portion marked 3B in FIG. 3A, directed to an interlocking coupling arrangement of the container of FIG. 3A.

The container 60 of FIG. 3A exemplifies a utility unit, having a bottom face 62 facilitating a utility unit articulation face and configured with several (four in the illustrated example) male couplers 66, seen at larger scale in FIGS. 3B and 3C.

It is appreciated that the container 60 is a mere example of a utility unit, which can be any article of utility, either stationary of mobile, having a utility and being detachable attachable to other utility units. A utility unit according to the present disclosure can be, by way of example, any type of container, drawer shed, work surface, locomotion system, mounting system, and the like.

The male couplers extend in register with the female couplers 40 of the hand truck (of both the frame and the ledge), as far as shape, size and positioning, whereby the utility unit, namely container 60, can be articulated to the hand truck at any location thereof. Each male coupler 66 comprises a projecting locking location 68 disposed in register with said depressed locking location 42 of a female coupler 40, and is configured with at least one locking tongue 72 (two in the example, one at each side of the locking location 68, i.e. facing away from one another), laterally extending along said engaging sliding path 48 (at a second, sense, opposite to said first sense), and configured for arresting engagement at a space between said locking rib 44 and depressed plain 46.

Further noted, the utility unit articulation face of the hand truck (frame/and or ledge) is configured with at least one locking latch arresting location, i.e. recesses 80, and the utility unit (container 60) is configured with a locking member 82 spring biased (by spring 86) to project from the bottom face 62 of the container 60, and being manually displaceable by a manipulating grip 87 through an aperture 89, between the normally projecting position (FIGS. 3A, 4A, 4B and 5B) and a pressed position (FIG. 5A), such that when in a locked position, as described below, said locking member 82 is disposed in register with at least one of the locking latch arresting locations 80.

Figure 4A:
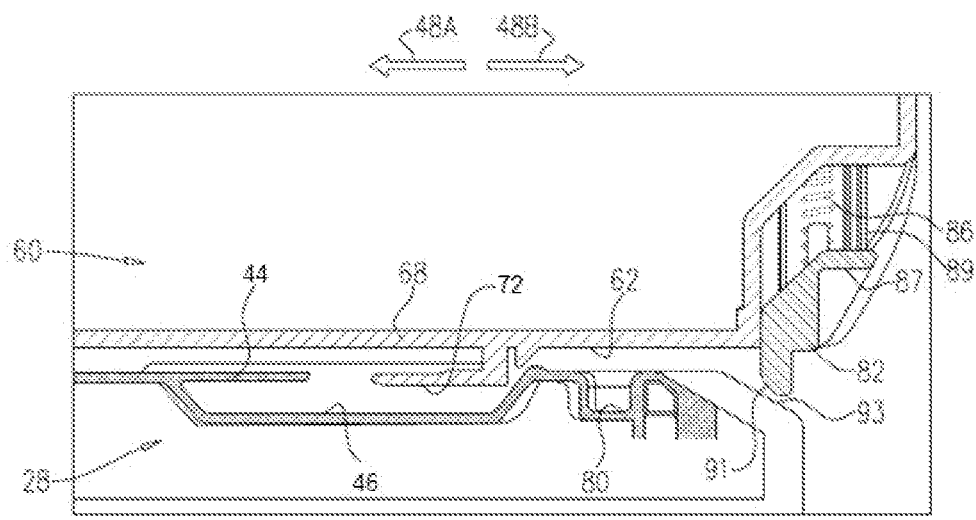
FIGS. 4A and 4B are locally sectioned views along line 4D-4D in FIG. 6A, illustrating consecutive steps of interlocking a utility unit container to the hand truck, by a articulation arrangement according to the disclosure.
Figure 4B:
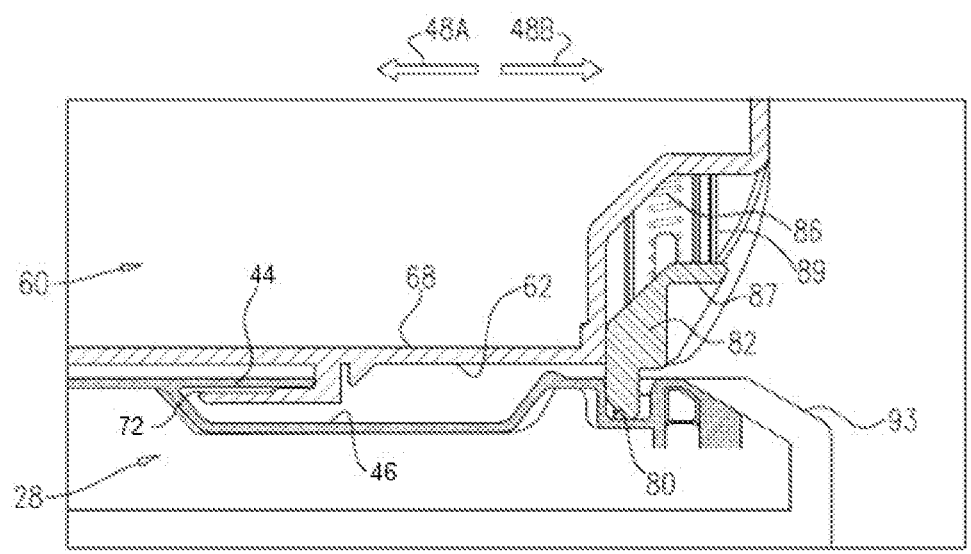
Figure 5A:
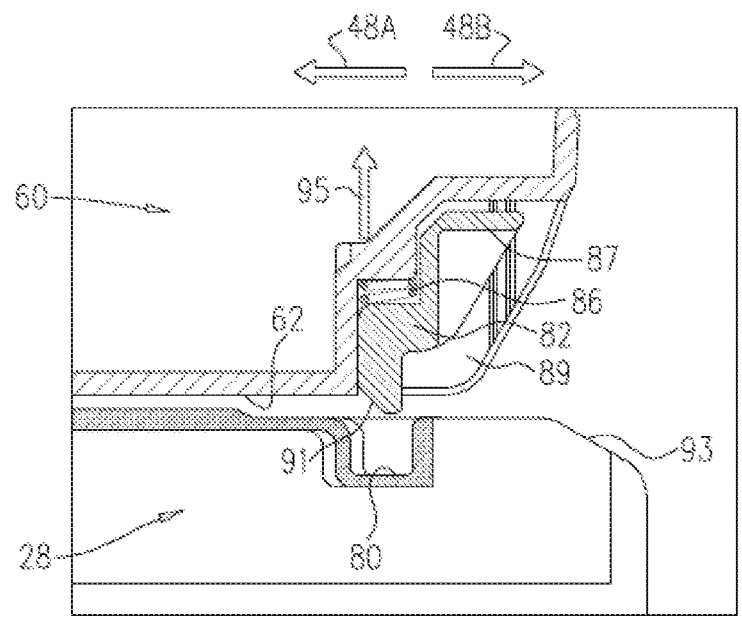
FIGS. 5A and 5B are locally sectioned views along line 5D-5D in FIG. 6A, illustrating consecutive steps of locking a utility unit container to the hand truck, according to the disclosure.
Figure 5B:
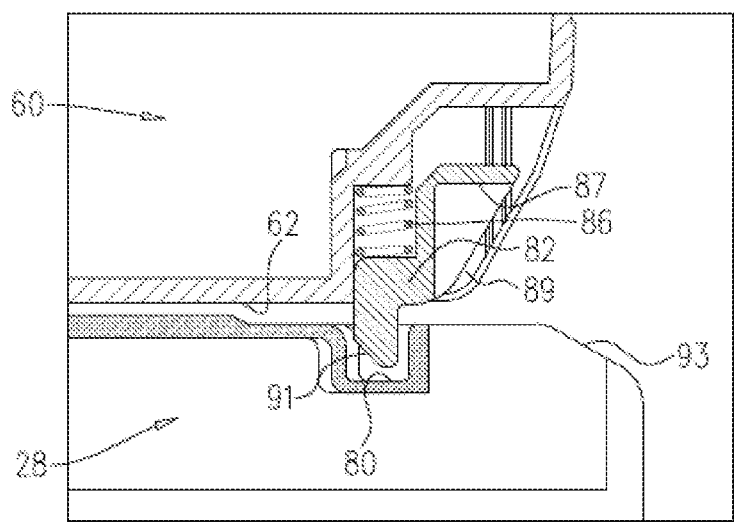

When it is required to detachably attach a utility unit to the hand truck, the former is placed over the later (FIGS. 4A and 5A), placing the projecting locking portions 68 within the depressed locking location 38 with the locking tongues 72 slidingly engaging below and being gradually arrested by the respective locking ribs 44 until complete arresting is obtained (FIG. 4B). At the fully engaged locked position (FIG. 4B) each locking rib 44 is disposed between the respective locking tongue 72 and the bottom face of the 62 of the utility unit (container 60), however bearing flush against at least a portion of the top surface of the locking tongues 72. Simultaneously, as the locking tongues 72 arrest by the locking ribs 44, the locking latch 82 of the utility unit (container 60) slides into the locking latch arresting location (recess 80) and finally snaps into locking engagement therewith. It is noted the locking latch 82 is configured with a chamfered nose 91 whereby upon sliding displacement of the utility unit along the sliding path 48A it first glides over a guiding ramp surface 93 of the hand truck, displacing it upwards against the biasing effect of spring 86 (in direction of arrow 95 in FIG. 5A), whereby when the utility unit 60 reaches the final locking position over the respective articulation face of the hand truck, the locking latch 82 plunges into arresting position within the recess 80.

At the locked position, utility unit 60 is attached over the articulation face of the frame or ledge of the hand truck, respectively, such that they can be moved as an integrated unit. Detaching of a utility unit 60 from a hand truck 10 is easily facilitated by unlocking, obtained by displacing the locking latch 82 upwards against the biasing effect of spring 86, whereby the utility unit 60 can be slidingly displaced along path 48B, and detached.

The male/female articulation arrangement disclosed herein above is an example, and is understood that other coupling arrangements can be utilized, such as, for example, a bayonet coupling arrangement, however bearing in mind that the coupling arrangement should offer a fast and reliable attaching/detaching arrangement between the utility unit and the hand truck. Furthermore, the male and female couplers can be disposed over one or both of the utility unit and hand truck. It is further appreciated that the coupling arrangement can be facilitated on either or both of the respective sides of the frame and ledge of the hand truck. Even more so, the articulation arrangements 32 and 38 of the frame 14 and the ledge 28, respectively, can be an integral part of the hand truck, or can be an interconnecting articulation platform fixedly or detachably attached to the frame and ledge, respectively.

Figure 6A:
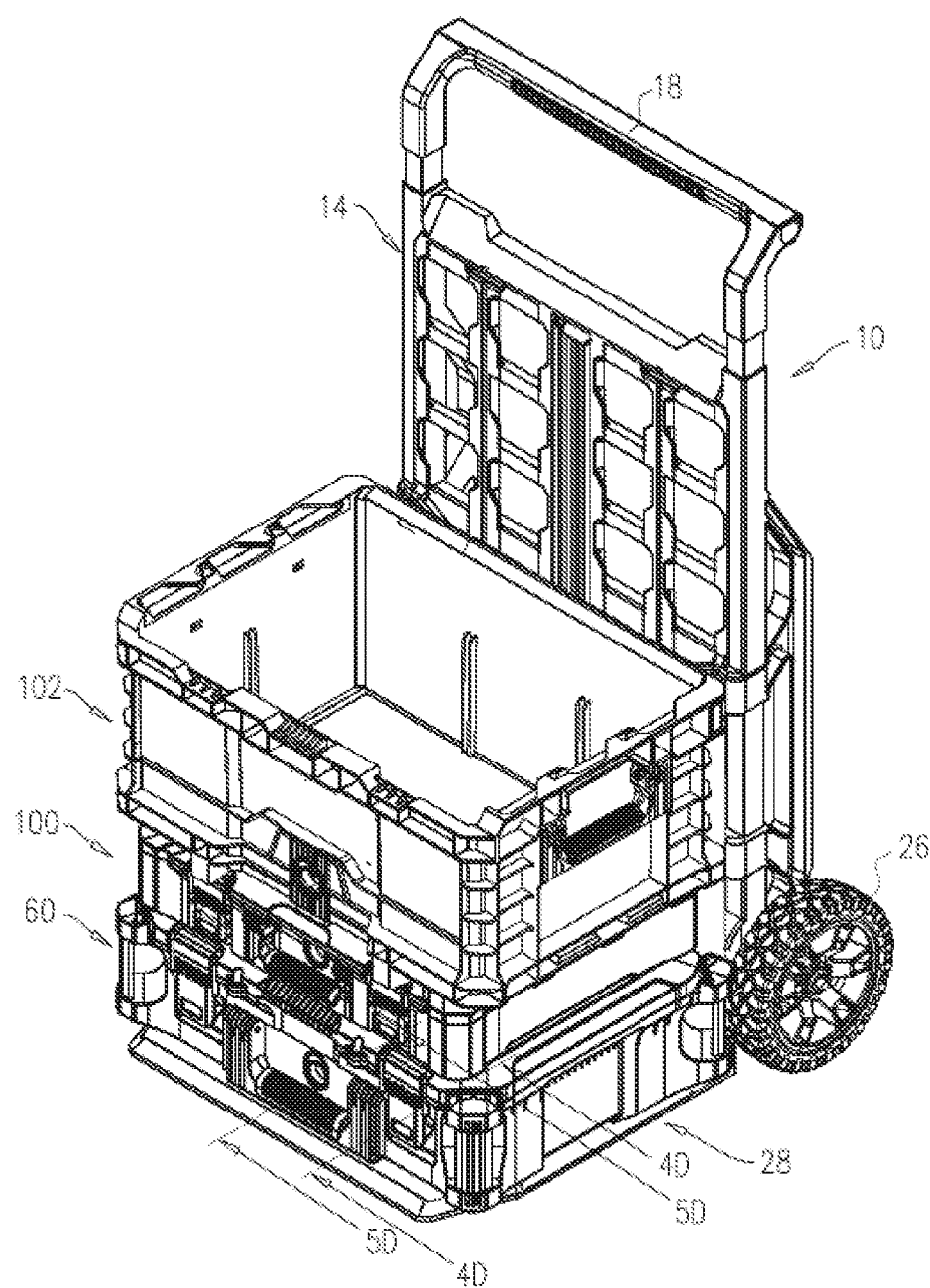
FIGS. 6A to 6D are examples of utility units articulated to a hand truck, according to the disclosure.

With further attention being made to FIGS. 6A to 6E, illustrating various articulation configurations with respect to the hand truck 10, as discussed herein. In FIG. 6A the hand truck is illustrated with a first utility unit (container 60)

articulated over the ledge 28, as exemplified hereinabove, with a second utility unit (container 100) articulated over the first utility unit 60, utilizing the same male/female coupling arrangement (i.e. the second utility unit 100 could just as well be articulated directly to the hand truck). A third utility unit 102, in the form of an open crate, is likewise articulated over the second utility unit 100, where articulation is facilitated through a side wall of the utility unit (crate 102). When transferring the hand truck 10 the three utility units are securely attached thereover as a unit, however readily detachable from one another.

Figure 6B:
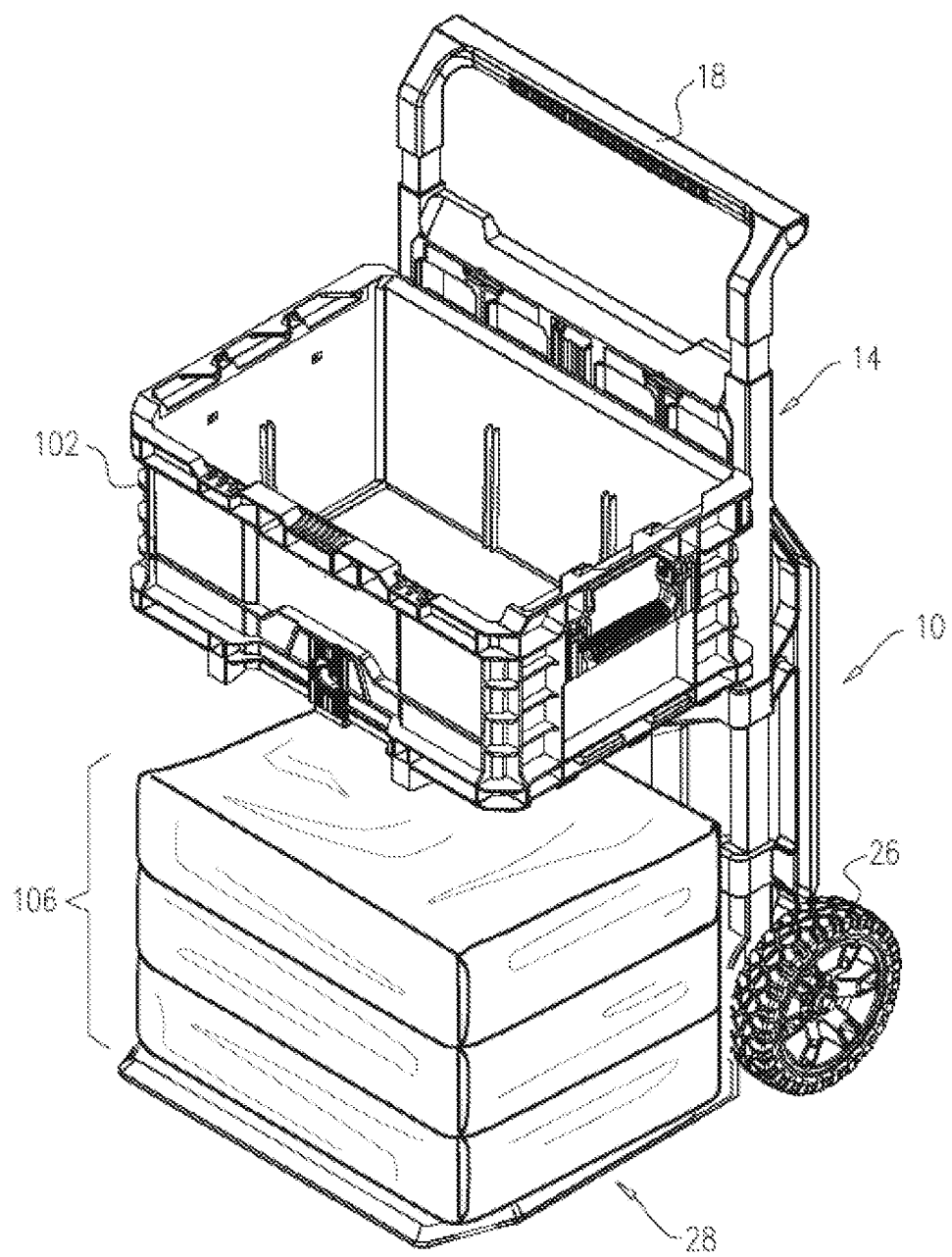

In FIG. 6B a free load (three cement bags 106) is placed over the ledge 28 (these can be secured by a bungee cord or the like, not shown), with the open crate 102 articulated to the frame 14.

Figure 6C:
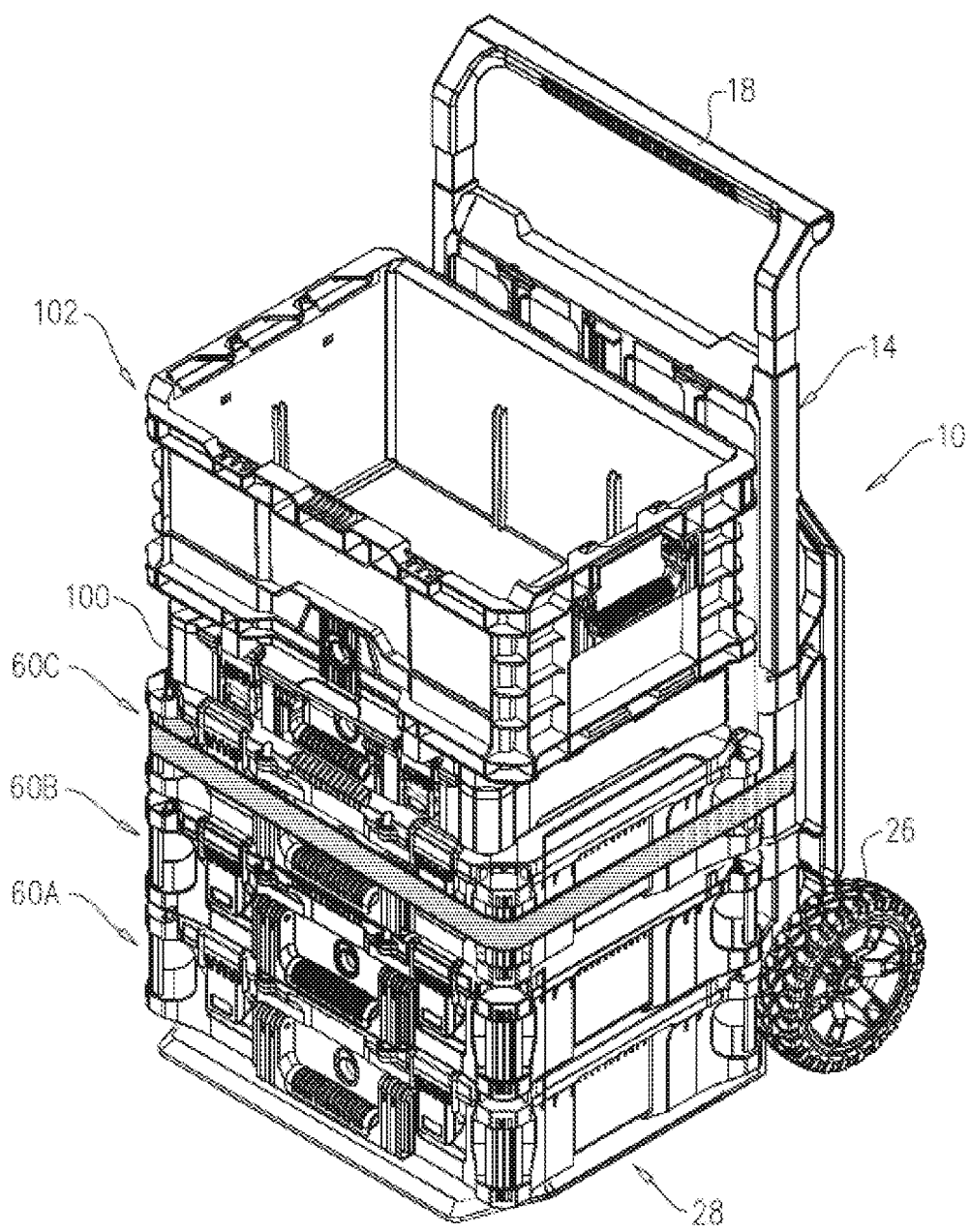

In FIG. 6C a first utility unit (container 60A) is articulated over the ledge 28 of the hand truck 10, with two similar containers 60B and 60C stacked and articulated on top of one another. Yet another container 100 is articulated over the container 60C and an open crate 102 is articulated to the frame 14.

Figure 6D:
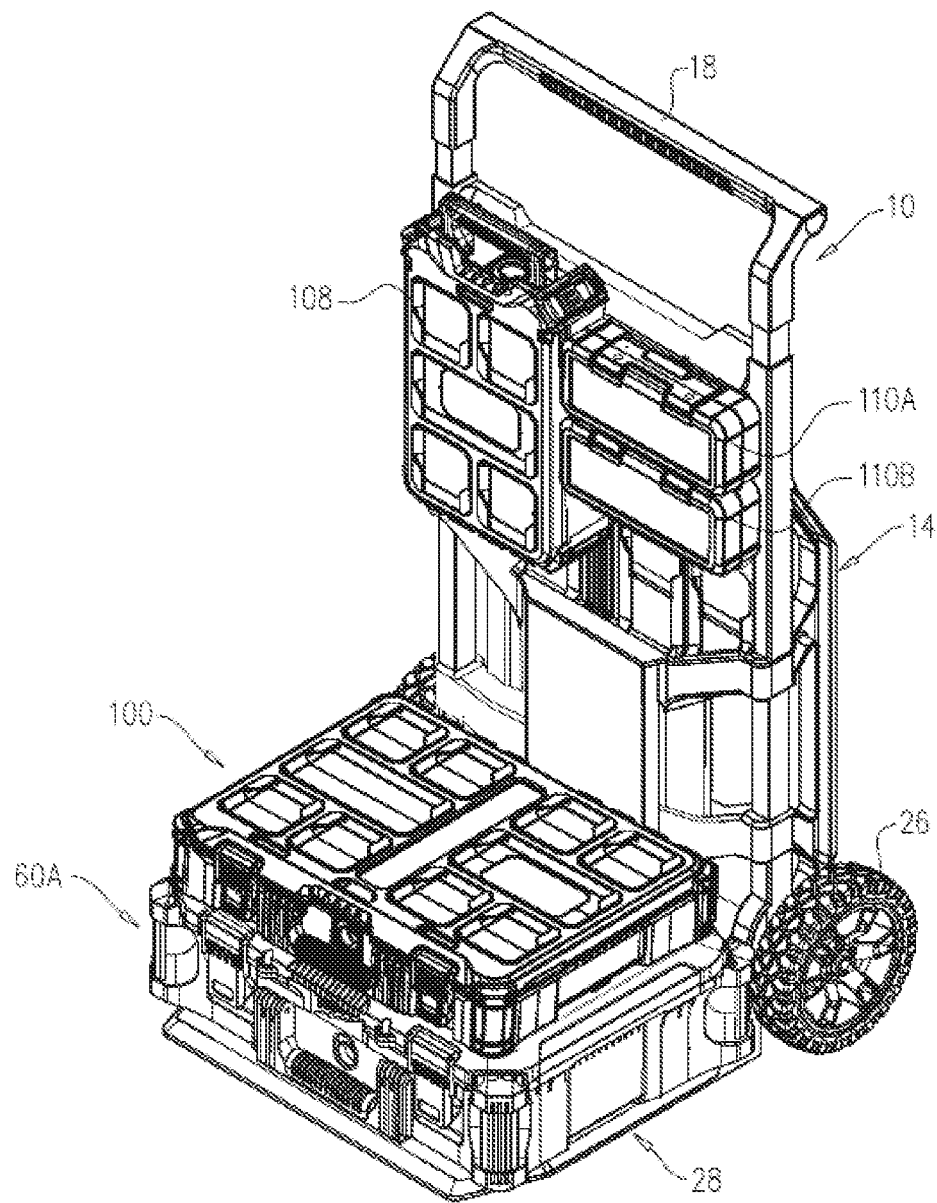

The arrangement illustrated in FIG. 6D presents the hand truck 10 fitted with a first container 60A articulated over the ledge 28, and a second container 100 articulated in turn over the first container 60A. A small container 108 is articulated at its base to the frame 14, and two boxes 110A and 110B are also articulated to the frame 14 through their respective bases. Thus, it is noted that the coupling arrangement offers readily articulation also of utility units having a smaller or larger footprint than the respective articulation portion of the hand truck.

Figure 7A:
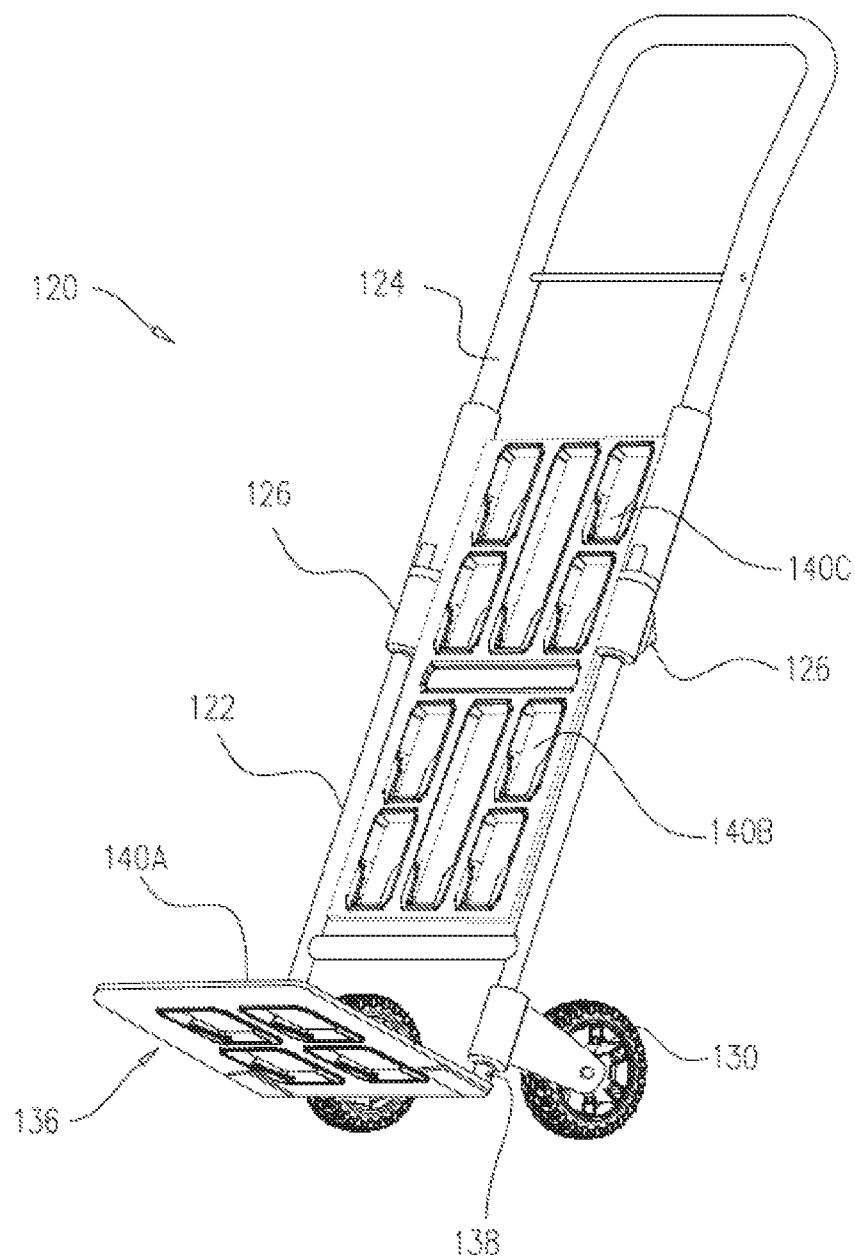
FIGS. 7A and 7B are directed to a convertible hand truck according to yet an example of the present disclosure, at an L-shape configuration and at a dolly configuration, respectively.
Figure 7B:
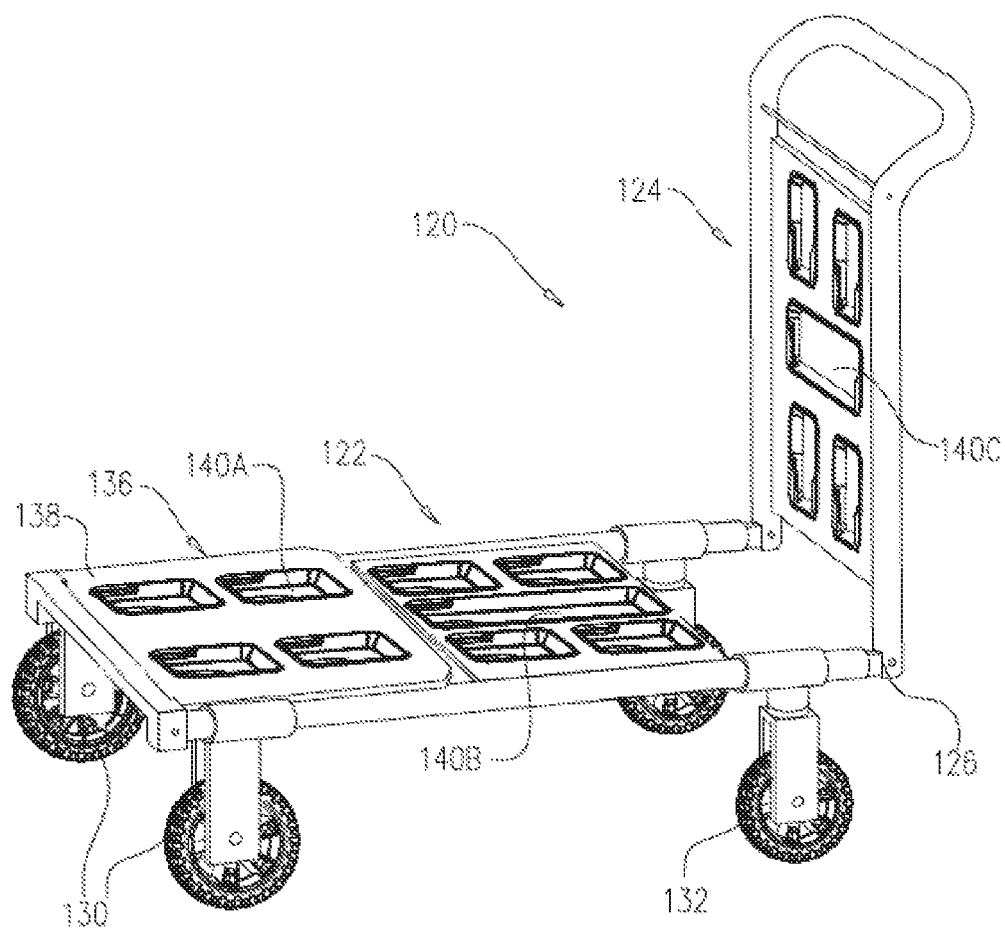

Turning now to FIGS. 7A and 7B there is illustrated a hand truck according to a different design, being a modular hand truck, convertible between several configurations. For example, the hand truck 120 has a frame configured with base portion 122 and top portion 124, articulated to one another by a joint coupler 126 facilitating converting the hand truck between an L-shaped cart (FIG. 7A), and a four-wheeled dolly like hand truck (FIG. 7B). At the L-shaped configuration only one pair of wheels 130 is required, whilst at the dolly like configuration an additional set of wheels 132 is added (or deployed from a stowed position). The ledge 136 pivotally extends at the bottom, wheeled end 138 of the base portion 122 of the frame.

It is seen that each of the of the ledge 136 and the two frame portions 122 and 124 is configured with a coupling arrangement 140A, 140B and 140C, respectively, each similar to the coupling arrangement disclosed hereinabove in connection with the previous example. The arrangement being such that one or more utility units can be detachably attached at any one or more articulation locations of the convertible hand truck 120, at any of its configurations.

The invention claimed is:

1. A hand truck comprising a frame having a first end, and a second end configured with a wheel set, and a ledge extending at said second end, wherein one or both of the frame and the ledge is configured with an articulation arrangement for detachably attaching thereto a utility unit, the articulation arrangement being configured to permit articulation of the utility unit by sliding the utility along a sliding path over a plane of the respective frame or ledge and extending parallel thereto, the sliding path extending parallel to the plane of the respective frame or ledge,
wherein the hand truck is an L-shaped cart, and the ledge is pivotable between a first position at which it extends substantially normal to the frame and is configured for bearing loads, and a collapsed position at which it extends substantially against the frame at a stowed position.

2. The hand truck of claim 1, wherein the articulation arrangement is a male-female type coupling arrangement, and wherein one or both of the frame and the ledge is configured with a male coupler or a female coupler and is configured for detachably attaching thereto a utility unit configured with the other one of a male coupler or a female coupler.

3. The hand truck of claim 1, wherein the articulation arrangement being disposed on either or both of a front face and a rear face of the frame, and the articulation arrangement comprises a set of couplers or a unitary coupling system.

4. The hand truck of claim 1, wherein a utility unit articulation face of the hand truck comprises at least one male coupler at one of the articulation face and a face of the utility unit, and a female coupler at the other one of the articulation face and a face of the utility unit, said female coupler having a depressed locking location configured with at least one locking rib extending above a depressed plain and along a sliding path, and having an open edge facing in a first sense; said male coupler having a projecting locking location disposed in register with said depressed locking location and configured with at least one locking tongue extending along an engaging sliding path at a second sense, opposite to said first sense, and configured for arresting engagement at a space between said locking rib and depressed plain.

5. The hand truck of claim 4, wherein the at least one locking rib extends substantially parallel to the sliding path.

6. The hand truck of claim 4, wherein the at least one locking rib extends substantially perpendicular and intersect the sliding path.

7. The hand truck of claim 4, wherein the female coupler comprises a single locking rib extending at rear end of the depressed locking location and substantially perpendicular to the sliding path.

8. The hand truck of claim 4, wherein the female coupler comprises two locking ribs extending at side edges of the depressed locking location and disposed substantially parallel to the sliding path.

9. The hand truck of claim 4, wherein the female coupler comprises two locking ribs each extending at a respective side edge of two neighboring depressed locking locations, said locking ribs disposed substantially parallel to the sliding path.

10. The hand truck of claim 4, wherein the coupling arrangement is configured as a snap-type locking of a utility unit over the articulation face.

11. The hand truck of claim 4, wherein the female coupler is configured at the top face of the articulation face.

12. The hand truck of claim 4, wherein the articulation arrangement further comprises a locking mechanism for preventing unintentional separation of the utility unit from the articulation face, while they are interlocked.

13. The hand truck of claim 12, wherein the locking mechanism comprises at one of a top face of the articulation face and a bottom face of the utility unit a locking latch arresting location, and the other one of said top face of the articulation face and a bottom face of the utility unit can comprise a locking member displaceable and disposed in register with said locking latch arresting location, wherein at a locked position the locking member is arrested by the corresponding locking latch arresting location, and further wherein disengaging the utility unit from the hand truck is facilitated by disengaging the locking latch from the locking latch arresting location.

14. A hand truck comprising a frame having a first end, and a second end configured with a wheel set, and a ledge extending at said second end, wherein one or both of the frame and the ledge is configured with an articulation arrangement for detachably attaching thereto a utility unit, the articulation arrangement being configured to permit articulation of the utility unit by sliding the utility unit along a sliding path over a plane of the respective frame or ledge and extending parallel thereto, the sliding path extending parallel to the plane of the respective frame or ledge, wherein the articulation arrangement is disposed on either or both of a front face and a rear face of the frame, and the articulation arrangement is a set of couplers or a unitary coupling system.

15. The hand truck of claim 14, wherein the articulation arrangement is a male- female type coupling arrangement, and wherein one or both of the frame and the ledge is configured with a male coupler or a female coupler and is configured for detachably attaching thereto a utility unit configured with the other one of a male coupler or a female coupler.

16. The hand truck of claim 14, wherein a utility unit articulation face of the hand truck comprises at least one male coupler at one of the articulation face and a face of the utility unit, and a female coupler at the other one of the articulation face and a face of the utility unit, said female coupler having a depressed locking location configured with at least one locking rib extending above a depressed plain and along a sliding path, and having an open edge facing in a first sense; said male coupler having a projecting locking location disposed in register with said depressed locking location and configured with at least one locking tongue extending along an engaging sliding path at a second sense, opposite to said first sense, and configured for arresting engagement at a space between said locking rib and depressed plain.

17. The hand truck of claim 16, wherein the at least one locking rib extends substantially parallel to the sliding path.

18. The hand truck of claim 16, wherein the at least one locking rib extends substantially perpendicular and intersect the sliding path.

19. The hand truck of claim 16, wherein the female coupler comprises a single locking rib extending at rear end of the depressed locking location and substantially perpendicular to the sliding path.

20. The hand truck of claim 16, wherein the female coupler comprises two locking ribs extending at side edges of the depressed locking location and disposed substantially parallel to the sliding path.

21. The hand truck of claim 16, wherein the female coupler comprises two locking ribs each extending at a respective side edge of two neighboring depressed locking locations, said locking ribs disposed substantially parallel to the sliding path.

22. The hand truck of claim 16, wherein the coupling arrangement is configured as a snap-type locking of a utility unit over the articulation face.

23. The hand truck of claim 16, wherein the female coupler is configured at the top face of the articulation face.

24. The hand truck of claim 16, wherein the female coupler is configured at the top face of the articulation face.

25. The hand truck of claim 24, wherein the locking mechanism comprises at one of a top face of the articulation face and a bottom face of the utility unit a locking latch arresting location, and the other one of said top face of the articulation face and a bottom face of the utility unit can comprise a locking member displaceable and disposed in register with said locking latch arresting location, wherein at a locked position the locking member is arrested by the corresponding locking latch arresting location, and further wherein disengaging the utility unit from the hand truck is facilitated by disengaging the locking latch from the locking latch arresting location.

\* \* \* \* \*